US011622053B2

(12) United States Patent
Shinoya et al.

(10) Patent No.: US 11,622,053 B2
(45) Date of Patent: Apr. 4, 2023

(54) MULTIFUNCTION DEVICE INCLUDING OPERATION PANEL PROVIDED AT PIVOTABLE UPPER HOUSING

(71) Applicant: BROTHER KOGYO KABUSHIKI KAISHA, Nagoya (JP)

(72) Inventors: Shota Shinoya, Nisshin (JP); Hiroaki Shigeno, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/711,112

(22) Filed: Apr. 1, 2022

(65) Prior Publication Data

US 2022/0321718 A1 Oct. 6, 2022

(30) Foreign Application Priority Data

Apr. 1, 2021 (JP) .............................. JP2021-062564
Apr. 1, 2021 (JP) .............................. JP2021-062567

(51) Int. Cl.
*H04N 1/00* (2006.01)

(52) U.S. Cl.
CPC ..... *H04N 1/00496* (2013.01); *H04N 1/00384* (2013.01); *H04N 1/00411* (2013.01);
(Continued)

(58) Field of Classification Search
CPC ........... G03G 21/1647; G03G 21/1821; G03G 21/186; G03G 21/18; G03G 21/1842; G03G 15/0896; G03G 21/1853; G03G 21/1814; G03G 21/1676; G03G 21/1857; G03G 21/1864; G03G 15/08; G03G 21/1825;
(Continued)

(56) References Cited

U.S. PATENT DOCUMENTS

2008/0100872 A1* 5/2008 Ito ........................ G03G 15/60
358/296
2021/0165356 A1* 6/2021 Hatakeyama ...... G03G 15/6579
(Continued)

FOREIGN PATENT DOCUMENTS

| JP | 2008-107637 A | 5/2008 |
| JP | 2012-248976 A | 12/2012 |
| JP | 2013-118528 A | 6/2013 |

*Primary Examiner* — Negussie Worku
(74) *Attorney, Agent, or Firm* — Merchant & Gould P.C.

(57) ABSTRACT

A multifunction device includes an image reading unit, an image forming unit, a lower housing, an upper housing, an operation panel, and a contacting/separating portion. The upper housing includes: a front wall from which the operation panel protrudes frontward; and a rear end portion pivotably connected to the lower housing. The upper housing is pivotable between a seated position and an ascent position relative to the lower housing. The operation panel has a panel front end and a panel bottom surface formed with a groove recessed upward therefrom. The contacting/separating portion is provided at the panel bottom surface. The contacting/separating portion abuts on the lower housing when the upper housing is at the seated position and is separated away from the lower housing when the upper housing is at the ascent position. The groove includes a first groove part positioned between the panel front end and the contacting/separating portion.

19 Claims, 16 Drawing Sheets

(52) U.S. Cl.
CPC ..... *H04N 1/00551* (2013.01); *H04N 1/00557* (2013.01); *H04N 1/00615* (2013.01); *H04N 1/00891* (2013.01); *H04N 2201/0094* (2013.01)

(58) Field of Classification Search
CPC ........... G03G 15/00; G03G 2221/1684; G03G 15/0808; G03G 15/0863; G03G 15/0879; G03G 15/0886; G03G 15/0889; G03G 2215/0119; G03G 2221/1869; G03G 15/0865; G03G 21/16; G03G 21/1619; G03G 21/1817; G03G 2221/163; G03G 15/0822; G03G 15/0856; G03G 15/0862; G03G 15/0872; G03G 15/0877; G03G 15/0891; G03G 15/553; G03G 15/556; G03G 15/80; G03G 21/00; G03G 21/007; G03G 21/02; G03G 21/12; G03G 21/1846; G03G 2215/066; G03G 2215/0668; G03G 2215/0695; G03G 2215/0802; G03G 2215/0894; G03G 2221/1654; G03G 2221/1657; G03G 2221/1663; G03G 2221/1853; G03G 15/0216; G03G 15/0855; G03G 15/2028; G03G 15/2035; G03G 15/2053; G03G 15/60; G03G 15/605; G03G 21/1623; G03G 21/1633; G03G 21/1661; G03G 21/1671; G03G 21/181; G03G 21/1867; G03G 2215/00185; G03G 2215/0132; G03G 2215/0141; G03G 2215/2032; G03G 2215/2035; G03G 2221/1606; B65H 2801/06; B65H 2301/4212; B65H 2801/27; B65H 37/04; B65H 16/00; B65H 19/105; B65H 2220/01; B65H 2301/163; B65H 2301/342; B65H 2301/41374; B65H 2301/4213; B65H 2301/51611; B65H 2301/51616; B65H 2402/60; B65H 2405/11151; B65H 2405/324; B65H 2407/10; B65H 2407/21; B65H 2511/30; B65H 2511/512; B65H 2511/514; B65H 2553/61; B65H 2701/1311; B65H 29/041; B65H 3/44; B65H 3/5223; B65H 31/02; B65H 31/10; B65H 31/3081; B65H 31/34; B65H 31/36; B65H 5/025; B65H 5/062; H04N 1/00384; H04N 1/00411; H04N 1/00496; H04N 1/00551; H04N 1/00557; H04N 1/00615; H04N 1/00891; H04N 2201/0094
USPC ......................................................... 358/498
See application file for complete search history.

(56) References Cited

U.S. PATENT DOCUMENTS

2021/0306491 A1* 9/2021 Nguyen ................. B65H 11/00
2022/0060594 A1* 2/2022 Ogawa ............... H04N 1/00554
2022/0263960 A1* 8/2022 Nakashima ........ H04N 1/00551
2022/0279078 A1* 9/2022 Makino .............. H04N 1/00557

* cited by examiner

MULTIFUNCTION DEVICE INCLUDING OPERATION PANEL PROVIDED AT PIVOTABLE UPPER HOUSING

CROSS REFERENCE TO RELATED APPLICATIONS

This application claims priorities from Japanese Patent Application Nos. 2021-062567 filed Apr. 1, 2021 and 2021-062564 filed Apr. 1, 2021. The entire contents of the priority applications are incorporated herein by reference.

BACKGROUND

Japanese Patent Application Publication No. 2008-107637 discloses a laser printer as an example of a conventional multifunction device. The laser printer includes an image reading unit, an image forming unit, a printer housing, and a document loading stand.

The document loading stand includes an operating portion, and a gripping portion for opening and closing the document loading stand. The gripping portion protrudes frontward from a front wall of the document loading stand. The operating portion is positioned on an upper surface of the gripping portion.

The document loading stand has a bottom surface provided with a leg portion. The leg portion protrudes downward from the bottom surface. The leg portion has a lower surface provided with a contacting/separating portion. The contacting/separating portion is in abutment with the printer housing when the document loading stand is at a closed position, and is separated away from the printer housing when the document loading stand is at an open position.

The leg portion has a front end surface extending downward at a position rearward of the front end portion of the gripping portion. The front end surface of the leg portion restricts a user's hand from reaching the contacting/separating portion when the user attempts to touch the gripping portion. Hence, this laser printer lowers a risk that user's hand or fingers may be pinched between the contacting/separating portion and the printer housing, leading to improvement in operability.

Further, Japanese Patent Application Publication no. 2013-118528 discloses an image forming apparatus as another example of the conventional multifunction device. The image forming apparatus includes an image reading unit, an ink jet recording unit, an apparatus body, and an automatic document conveying unit.

The automatic document conveying unit also functions as a document cover. The automatic document conveying unit is connected to a rear end portion of the apparatus body. The automatic document conveying unit is pivotally movable about a pivot axis extending in a left-right direction between a closed position where the conveying unit closes a contact glass of the image reading unit and an open position where the conveying unit opens the contact glass.

The automatic document conveying unit is provided with a handle. The handle is positioned above a front wall of the apparatus body and in a central region of the automatic document conveying unit in the left-right direction. The handle is movable by the pivotal movement of the conveying unit.

The apparatus body includes an operation panel. The operation panel protrudes frontward from the front wall of the apparatus body. The operation panel is positioned to overlap an entirety of the handle in the left-right direction.

SUMMARY

In the conventional laser printer according to the former example, the leg portion must largely protrude downward from the bottom surface of the document loading stand in order to restrain the user's hand from touching the contacting/separating portion, which in turn renders the leg portion bulky in an up-down direction. Accordingly, downsizing of a laser printer in the up-down direction is hard to obtain.

Further, in the conventional image forming apparatus according to the latter example, the user's hand is likely to abut on the operation panel when the user attempts to grip the handle to pivotally move the automatic document conveying unit. Still further, it is also likely that the user's hand or fingers may be pinched between the handle and the operation panel. As such, improvement in operability for pivotally moving the automatic document conveying unit may not be attainable.

In view of the foregoing, it is an object of the present disclosure to provide a multifunction device capable of improving operability as well as realizing downsizing in the up-down direction.

It is another object of the disclosure to provide a multifunction device capable of realizing enhanced operability in pivotally moving the document cover.

In order to attain the above and other object, according to one aspect, the present disclosure provides a multifunction device including an image reading unit, an image forming unit, a lower housing, an upper housing, an operation panel, and a contacting/separating portion. The image reading unit includes a reading sensor configured to read an image on a document. The image forming unit is positioned below the image reading unit and is configured to form an image on a sheet. The lower housing accommodates the image forming unit therein. The upper housing accommodates the image reading unit therein and is pivotally movable about a pivot axis extending in a left-right direction relative to the lower housing. The upper housing includes: a front wall extending in the left-right direction; and a rear end portion positioned rearward of the front wall. The rear end portion of the upper housing is connected to the lower housing such that the upper housing is pivotable about the pivot axis between a seated position where the front wall of the upper housing is seated on the lower housing and an ascent position where the front wall of the upper housing is separated away upward from the lower housing. The upper housing has a housing bottom surface. The operation panel protrudes frontward from the front wall of the upper housing. The operation panel has a panel front end and a panel bottom surface formed with a groove recessed upward therefrom. The contacting/separating portion is provided on the housing bottom surface. The contacting/separating portion is in abutment with the lower housing in a state where the upper housing is at the seated position and is separated away from the lower housing in a state where the upper housing is at the ascent position. The groove includes a first groove part positioned between the panel front end and the contacting/separating portion.

With this structure, in a case where a user attempts to hook his fingers on the operation panel, his fingertips moving over the panel bottom surface of the operation panel are introduced into the first groove part of the groove before the fingertips reach the contacting/separating portion. In this way, the groove can restrain the user's fingers from reaching the contacting/separating portion. Hence, there is a reduced likelihood that the user's fingers are pinched between the contacting/separating portion and the lower housing.

Further, this multifunction device does not include a conventional leg portion that largely protrudes downward from the bottom surface of the upper housing and that is positioned frontward of the contacting/separating portion for preventing the user's hand from reaching the contacting/separating portion. Therefore, the multifunction device can obviate the problem caused by the presence of the bulky leg portion in the up-down direction.

Accordingly, the multifunction device according to the disclosure can provide an improved operability and a size reduction in the up-down direction.

According to another aspect, the present disclosure also provides a multifunction device including an image reading unit, an image forming unit, a lower housing, an upper housing, and a document cover. The image reading unit has a document loading surface and includes a reading sensor configured to read an image on a document supported by the document loading surface. The image forming unit is positioned below the image reading unit and is configured to form an image on a sheet. The lower housing accommodates the image forming unit therein. The upper housing accommodates the image reading unit therein, and has a rear end portion. The upper housing includes: a front wall extending in a left-right direction and positioned frontward of the rear end portion; and an operation panel protruding frontward from the front wall. The document cover is connected to the rear end portion of the upper housing and is pivotally movable relative to the upper housing about a cover axis extending in the left-right direction between a closed position where the document cover closes the document loading surface and an open position where the document cover opens the document loading surface. The document cover includes a finger hook portion configured to receive a user's hand to pivotally move the document cover relative to the upper housing. The finger hook portion is positioned above the front wall of the upper housing and in a region including a center of the document cover in the left-right direction. The operation panel has a panel lateral end and another panel lateral end opposite to each other in the left-right direction, the panel lateral end being closer to the center in the left-right direction of the document cover than the another panel lateral end is to the center in the left-right direction of the document cover. The finger hook portion has one lateral end and another lateral end opposite to each other with respect to the center of the document cover in the left-right direction, the one lateral end being closer to the operation panel than the another lateral end is to the operation panel in the left-right direction. The panel lateral end of the operation panel is at a position either: coincident with a position of the one lateral end of the finger hook portion in the left-right direction; or spaced apart from the position of the one lateral end of the finger hook portion in a direction away from the center of the document cover with respect to the left-right direction.

Due to the above-described positional relationship between the panel lateral end of the operation panel and the lateral finger access surface of the finger hook portion, the operation panel is positioned not to overlap the finger hook portion in the left-right direction. Hence, when the user attempts to hook his fingers on the finger hook portion to pivotally move the document cover, the user's finger is less likely to abut on the operation panel, and is less likely to be pinched between the finger hook portion and the operation panel.

Further, with this structure, the finger hook portion is easily accessible to the user because the finger hook portion is positioned in the region including the center in the left-right direction of the document cover. Accordingly, the operation for pivotally moving the document cover can be easily performed.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

1. First Embodiment

Hereinafter, a multifunction device 1 according to a first embodiment of the present disclosure will be described with reference to FIGS. 1 through 12.

Figure 1:
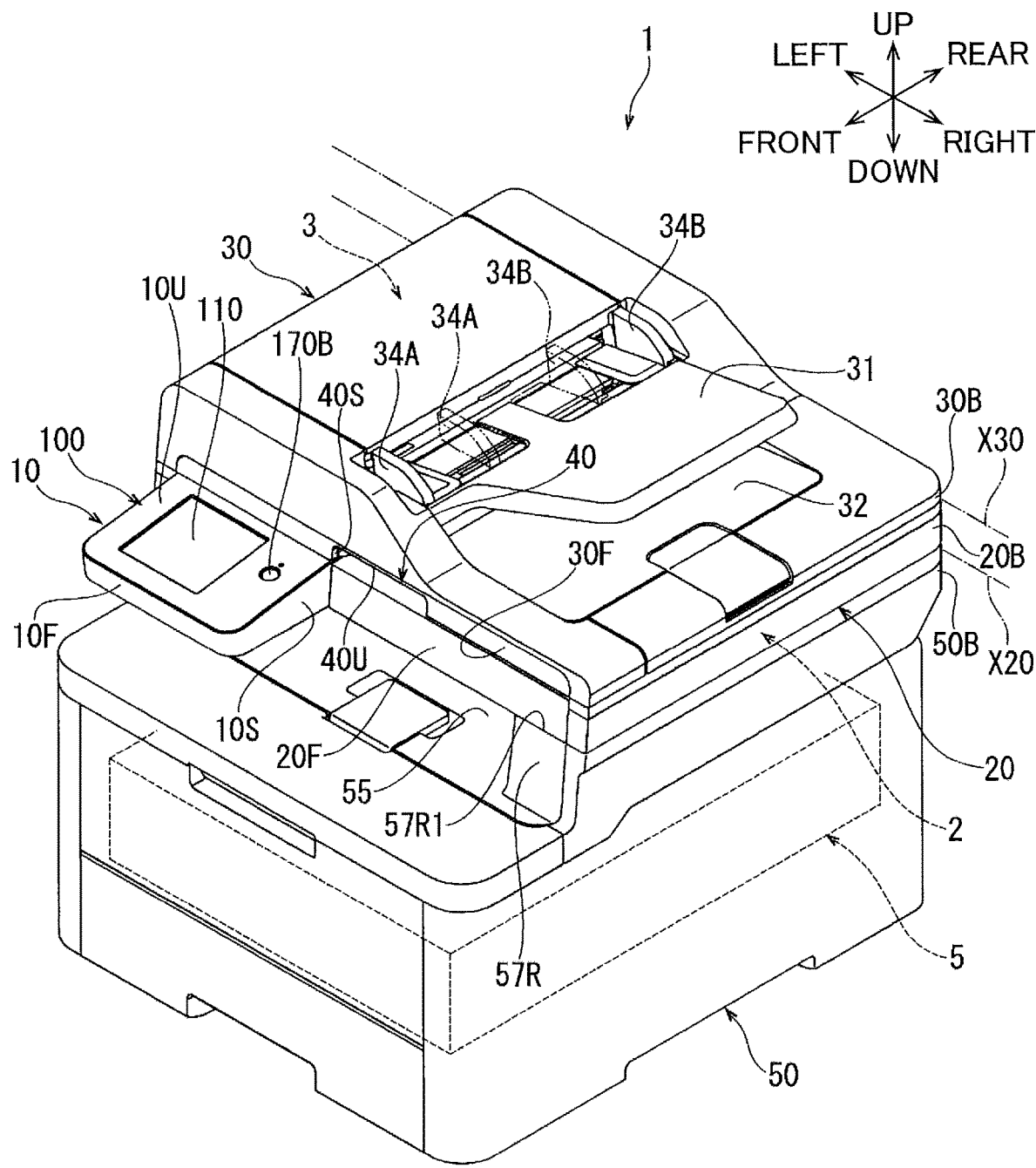
FIG. 1 is a perspective view of a multifunction device according to a first embodiment.

The expressions "front", "rear", "above", "below", "left", and "right" with reference to the multifunction device 1 will be defined based on an assumption that the multifunction device 1 is disposed in an orientation in which it is intended to be used. More specifically, the side at which an operation panel 10 is positioned in FIG. 1 is defined as a front side of the multifunction device 1, and right, left, front, rear, and upper and lower sides with respect to the multifunction device 1 will be defined based on a user who faces the operation panel 10 to access the operation panel 10. Further, directions indicated by arrows in FIGS. 2 through 12 correspond to those directions indicated in FIG. 1.

<Overall Structure>

As illustrated in FIGS. 1 through 5, the multifunction device 1 includes a lower housing 50, an upper housing 20, a document cover 30, an image forming unit 5, and an image reading unit 2.

Figure 4:
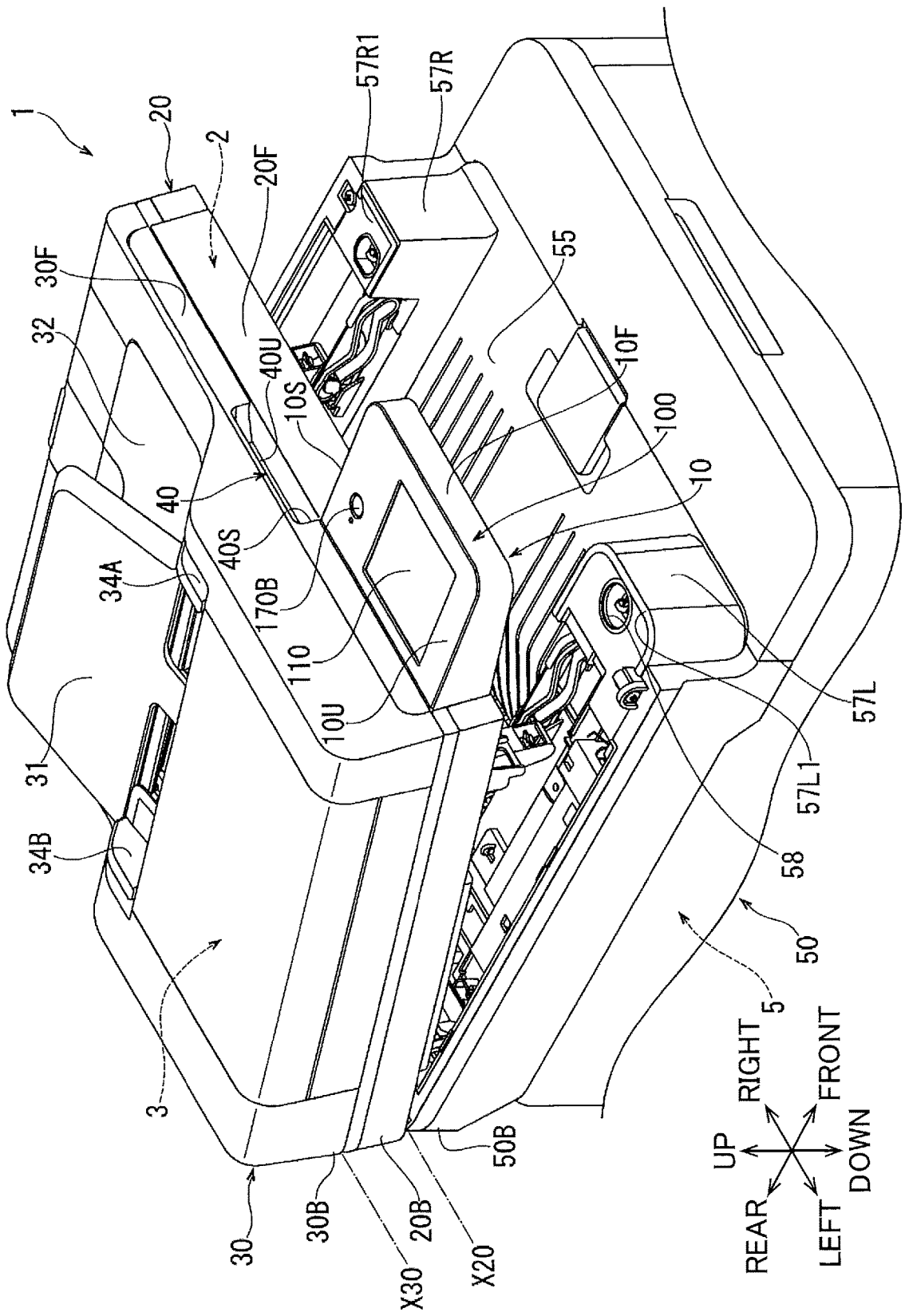
FIG. 4 is a partial perspective view of the multifunction device according to the first embodiment in a state where an upper housing is at its ascent position.

As illustrated in FIG. 1, the lower housing 50 has a generally box-like shape. As illustrated in FIG. 4, the lower housing 50 has an upper surface on which a discharge tray 55, a left supporting portion 57L, and a right supporting portion 57R are provided. The discharge tray 55 is positioned at a center on the upper surface of the lower housing 50 in a left-right direction.

The left supporting portion 57L is positioned leftward of the discharge tray 55. The left supporting portion 57L extends in a front-rear direction and protrudes upward from the upper surface of the lower housing 50 such that an upper surface of the left supporting portion 57L is higher than the discharge tray 55.

The left supporting portion 57L includes a left abutment portion 57L1 and a positioning recess 58. The left abutment portion 57L1 is positioned at a front end of the upper surface of the left supporting portion 57L. The left abutment portion 57L1 protrudes slightly upward from the upper surface of the left abutment portion 57L1.

The left abutment portion 57L1 has a rib-like shape having a generally U-shape. That is, the left abutment portion 57L1 includes a front part extending in the left-right direction along a front end of the left supporting portion 57L, a left part extending rearward along a left end of the left supporting portion 57L from a left end of the front part, and a right part extending rearward along a right end of the left supporting portion 57L from a right end of the front part.

The positioning recess 58 is positioned in a front end portion of the left supporting portion 57L and is recessed downward from the upper surface of the left supporting portion 57L. The positioning recess 58 has a circular shape in a plan view, and is positioned in a U-shaped space of the left abutment portion 57L1.

The left supporting portion 57L extends rearward to a rear end portion 50B of the lower housing 50. The left supporting portion 57L has a side surface facing leftward which constitutes an upper portion of a left side surface of the lower housing 50.

The right supporting portion 57R is positioned rightward of the discharge tray 55. The right supporting portion 57R extends in the front-rear direction and protrudes upward from the upper surface of the lower housing 50 such that an upper surface of the right supporting portion 57R is higher than the discharge tray 55.

Figure 5:
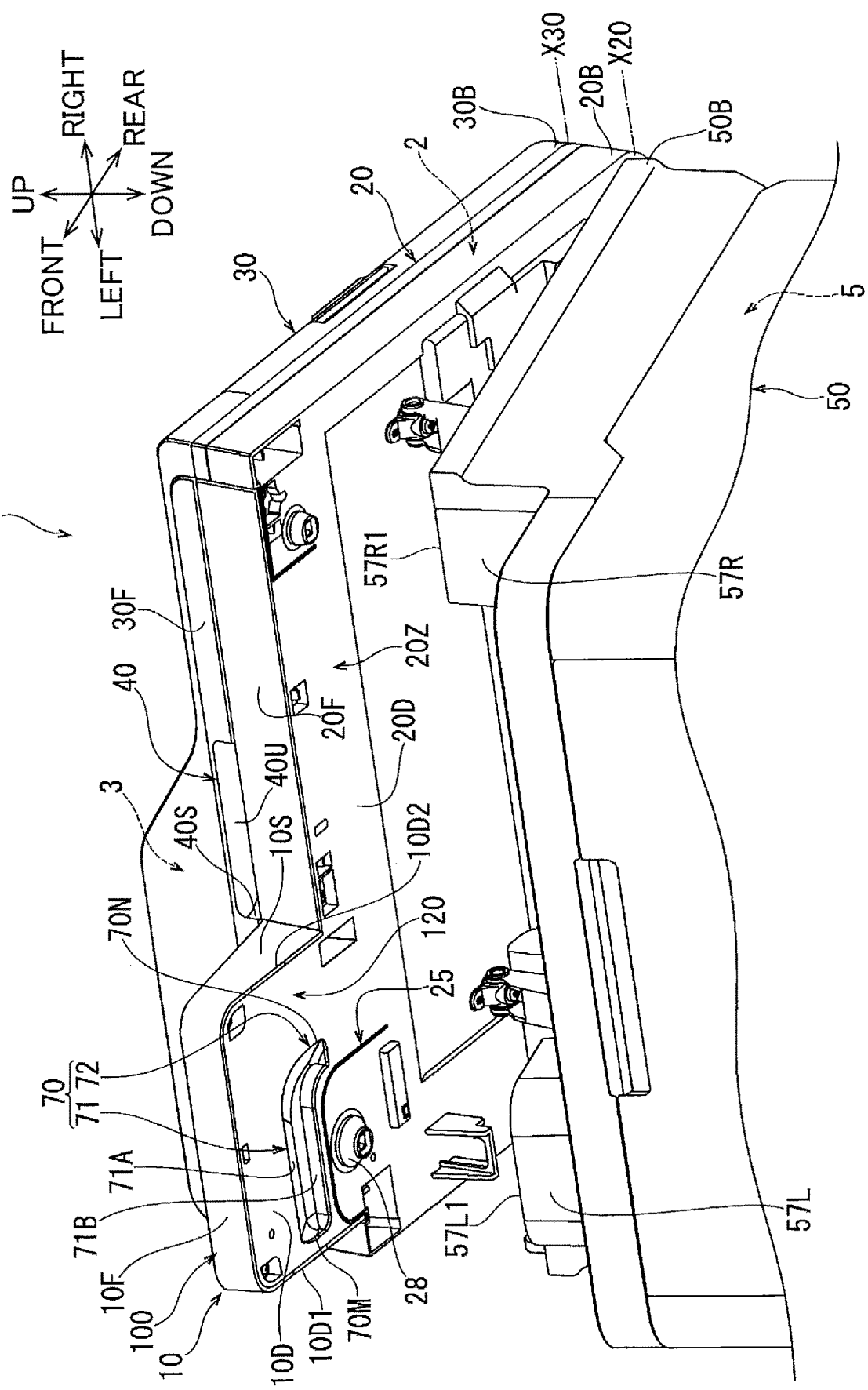
FIG. 5 is another partial perspective view of the multifunction device according to the first embodiment in the state where the upper housing is at its ascent position.

The right supporting portion 57R includes a right abutment portion 57R1 facing upward. The right abutment portion 57R1 is positioned in a front end portion of the right supporting portion 57R. As illustrated in FIG. 5, the right supporting portion 57R has a side surface facing rightward which constitutes an upper portion of a right side surface of the lower housing 50. The right supporting portion 57R extends rearward to the rear end portion 50B of the lower housing 50.

The lower housing 50 includes a rear wall (not illustrated) constituting the rear end portion 50B. The rear wall extends in the left-right direction to connect a rear end of the left supporting portion 57L to a rear end of the right supporting portion 57R.

The lower housing 50 accommodates the image forming unit 5 therein. The image forming unit 5 is of a well-known ink jet type or an electro-photographic type. The image forming unit 5 is configured to form an image on a sheet and discharge the sheet to the discharge tray 55. A detailed description for the image forming unit 5 is omitted here.

Figure 2:
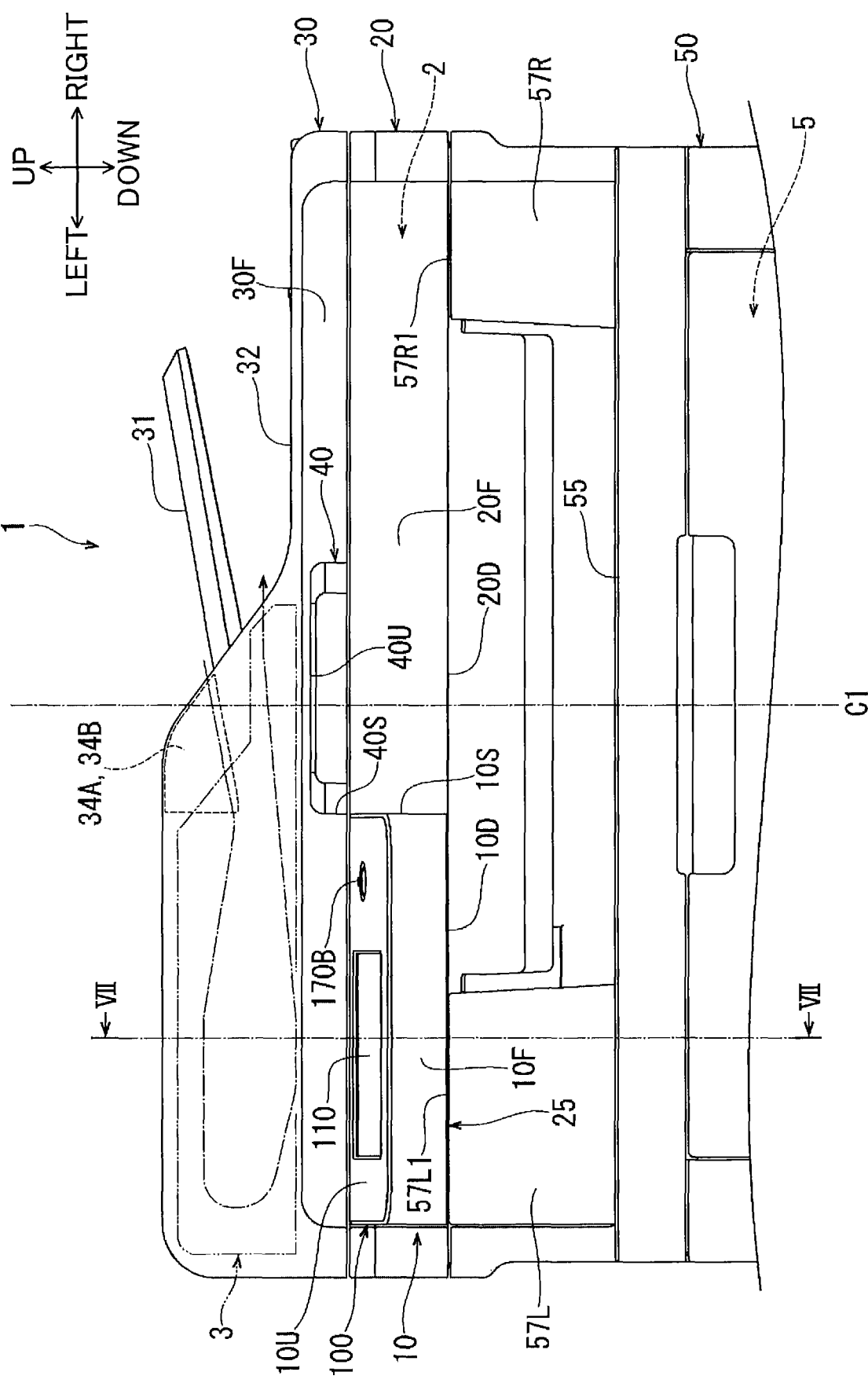
FIG. 2 is a partial front view of the multifunction device according to the first embodiment.

As illustrated in FIGS. 1 and 2, the upper housing 20 is positioned above the lower housing 50. The upper housing 20 has a flattened box-like shape whose length in the up-down direction is much smaller than that of the lower housing 50.

Figure 6:
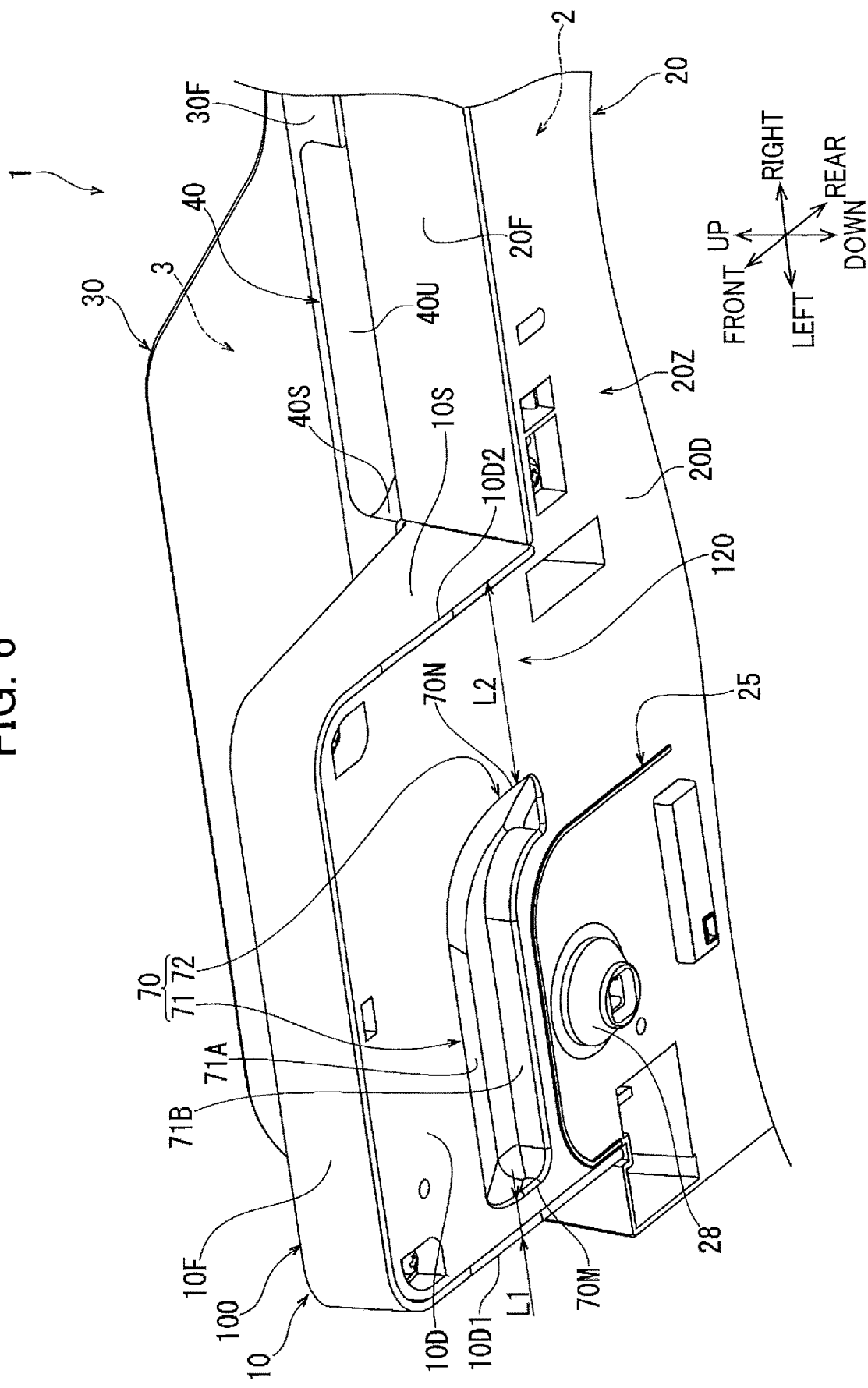
FIG. 6 is an enlarged partial perspective view of the multifunction device according to the first embodiment, and particularly illustrating a bottom surface of the upper housing, a bottom surface of an operation panel, a contacting/separating portion, and a groove in the multifunction device.

As illustrated in FIGS. 5 and 6, the upper housing 20 has a bottom surface 20D that is a generally flat surface. Unlike a conventional multifunction device, no conventional leg portions are provided on the bottom surface 20D to largely protrude downward therefrom toward the left supporting portion 57L and the right supporting portion 57R in the multifunction device 1 according to the embodiment, in order to restrain a user's hand from reaching a contacting/separating portion 25 (described later).

The upper housing 20 includes a front wall 20F, and a rear end portion 20B. The front wall 20F extends in the left-right direction, and is positioned frontward of the rear end portion 20B. The rear end portion 20B is connected to the rear end portion 50B of the lower housing 50 through hinges (not illustrated) defining a pivot axis X20 that extends in the left-right direction.

The upper housing 20 is pivotally movable about the pivot axis X20 between a seated position illustrated in FIGS. 1 through 3 and 7 and an ascent position illustrated in FIGS. 4 and 5.

As illustrated in FIG. 2, in a state where the upper housing 20 is at the seated position, the front wall 20F of the upper housing 20 is seated on the left abutment portion 57L1 of the left supporting portion 57L and the right abutment portion 57R1 of the right supporting portion 57R of the lower housing 50. In this state, an image forming operation can be performed by the image forming unit 5 in the multifunction device 1.

On the other hand, as illustrated in FIG. 4, in a state where the upper housing 20 is at the ascent position, the front wall 20F is separated upward away from the left supporting portion 57L and the right supporting portion 57R such that the front wall 20F is positioned higher at the ascent position than at the seated position. In this state, the user can easily take out the sheet discharged on the discharge tray 55.

As illustrated in FIGS. 5 and 6, a positioning protrusion 28 and the contacting/separating portion 25 are provided on the bottom surface 20D of the upper housing 20. The positioning protrusion 28 protrudes downward from the bottom surface 20D at a position in alignment with the positioning recess 58 of the lower housing 50. The positioning protrusion 28 includes a cylindrical base portion, and a frusto-conical free end portion extending downward from the base portion.

The contacting/separating portion 25 is located at a position near the front wall 20F and a left end of the bottom surface 20D of the upper housing 20. The contacting/separating portion 25 protrudes slightly downward from the bottom surface 20D. The contacting/separating portion 25 has a rib-like shape having a generally U-shape. That is, the contacting/separating portion 25 includes a front part extending in the left-right direction and positioned frontward of the positioning protrusion 28, a left part extending rearward from a left end of the front part, and a right part extending rearward from a right end of the front part. Hence, the positioning protrusion 28 is positioned within a space in the U-shape of the contacting/separating portion 25. The contacting/separating portion 25 has a protruding amount smaller than a protruding amount of the positioning protrusion 28.

As illustrated in FIG. 2, in the state where the upper housing 20 is at the seated position, the contacting/separating portion 25 abuts on the left abutment portion 57L1 of the left supporting portion 57L from above. At this time, the cylindrical base end portion of the positioning protrusion 28 is fitted in the circular positioning recess 58, so that the upper housing 20 is fixed in position relative to the lower housing 50 in the front-rear direction and the left-right direction. On the other hand, as illustrated in FIG. 5, the contacting/separating portion 25 is separated upwardly away from the left abutment portion 57L1 in the state where the upper housing 20 is at the ascent position.

Incidentally, in the present embodiment, the contacting/separating portion 25 is in a form of a rib. However, a contacting/separating portion of the present disclosure need not be a rib, provided that the contacting/separating portion can abut on the lower housing 50 when the upper housing 20 is at the seated position. For example, a flat part of the bottom surface 20D (without provision of any part protruding from the bottom surface 20D) may function as the contacting/separating portion of the present disclosure.

Figure 3:
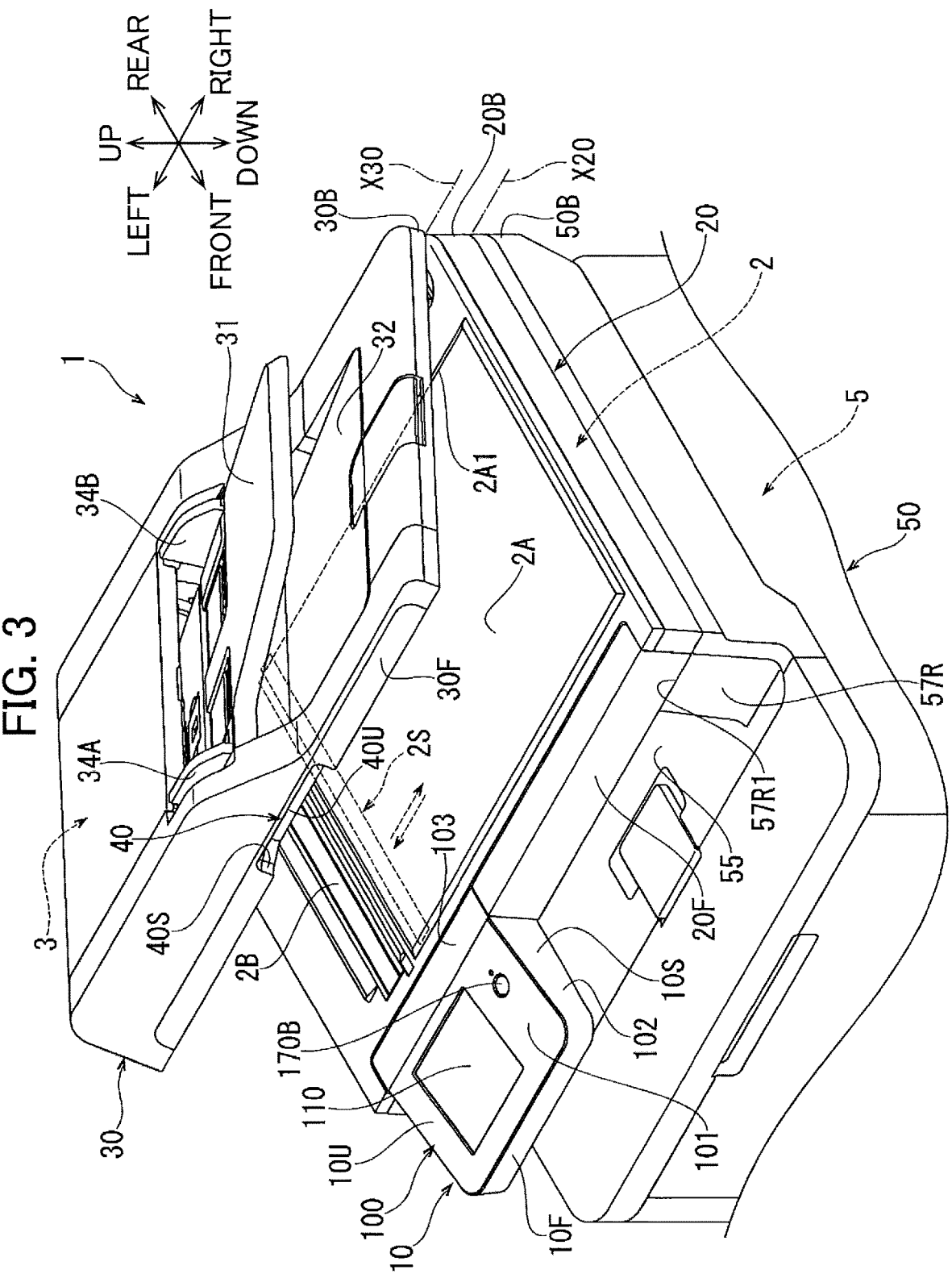
FIG. 3 is a partial perspective view of the multifunction device according to the first embodiment in a state where a document cover is at its open position.

As illustrated in FIG. 3, the upper housing 20 accommodates therein the image reading unit 2. That is, the image forming unit 5 is positioned below the image reading unit 2. The front wall 20F is positioned frontward of the image reading unit 2 to cover the same. The image reading unit 2 has a document loading surface 2A and a reading surface 2B, and includes a reading sensor 2S.

The document loading surface 2A is a top surface of a platen glass positioned on an upper surface of the upper housing 20. The document loading surface 2A occupies a substantially large area on the upper surface of the upper housing 20. The document loading surface 2A has a rectangular shape having a rear edge 2A1 that extends in the left-right direction and that is positioned near the rear end portion 20B of the upper housing 20. The document loading surface 2A is configured to support a document which is a target to be read. The document may be a sheet such as a plain paper and an OHP sheet, and/or publications.

The reading surface 2B is a top surface of another platen glass positioned leftward of the document loading surface 2A and elongated in the front-rear direction. The reading surface 2B is utilized when a conveying unit 3 (described later) is operated.

The reading sensor 2S is positioned below the document loading surface 2A, and is movable in the left-right direction (a main scanning direction). In a case where the image reading unit 2 reads an image on the document supported on the document loading surface 2A, the reading sensor 2S is configured to read the image on a line-by-line basis in the front-rear direction (a sub-scanning direction) while moving in the main scanning direction.

Incidentally, the reading sensor 2S is positioned below the reading surface 2B and stays immovable (stationary) while the conveying unit 3 is in operation.

As illustrated in FIGS. 1 and 2, the document cover 30 is positioned above the upper housing 20. The document cover 30 has a flat bottom surface whose shape is substantially the same as the top surface of the upper housing 20.

The document cover 30 has a rear end portion 30B connected to the rear end portion 20B of the upper housing 20 through hinges (not illustrated) defining a cover axis X30 extending in the left-right direction.

The document cover 30 is pivotally movable about the cover axis X30 between a closed position (illustrated in FIGS. 2, and 4 through 7) and an open position (illustrated in FIG. 3).

As illustrated in FIG. 1, the document cover 30 covers an entirety of the top surface (including the document loading surface 2A) of the upper housing 20 in a state where the document cover 30 is at the closed position. At the closed position, the document cover 30 enables the document supported on the document loading surface 2A to be in intimate contact with the document loading surface 2A and restrains external light from reaching the reading sensor 2S.

On the other hand, as illustrated in FIG. 3, at the open position, the document cover 30 is positioned upward away from the top surface of the upper housing 20 to expose the document loading surface 2A. In this state, the user can place a document on the document loading surface 2A and can take out the document from the document loading surface 2A.

As illustrated in FIGS. 1 and 2, the document cover 30 includes a supply tray 31, a discharge tray 32, and the conveying unit 3. The supply tray 31 and the discharge tray 32 are positioned in a rightward portion of the document cover 30.

The supply tray 31 is positioned above the discharge tray 32. The supply tray 31 is configured to support a stack of documents to be read. The supply tray 31 includes side guides 34A, 34B.

As indicated by solid lines and two-dotted chain lines in FIG. 1, the side guides 34A, 34B are slidably movable toward and away from each other in the front-rear direction. Such slidable side guides 34A, 34B serve to fix the position in the front-rear direction of the document(s) on the supply tray 31.

As illustrated in FIG. 2, the conveying unit 3 is positioned at an internal left end portion of the document cover 30. The conveying unit 3 has a conventional structure and therefore a detailed description therefore is omitted here. The conveying unit 3 is configured to: convey each document on the supply tray 31 toward the reading sensor 2S rested immovable at a position below the reading surface 2B; cause the document to move past the reading surface 2B such that the reading sensor 2S can read the image on the document; and then discharge the document onto the discharge tray 32.

A datum line C1 extending in the up-down direction is delineated in FIG. 2. The datum line C1 is a center line passing through a center in the left-right direction of the upper housing 20 and a center in the left-right direction of the document cover 30 (will be referred to as a center line C1, hereinafter). That is, in the depicted embodiment, the center in the left-right direction of the upper housing 20 is coincident with the center in the left-right direction of the document cover 30.

<Finger Hook Recess>

As illustrated in FIGS. 1 through 3, the document cover 30 has a finger hook recess 40.

The finger hook recess 40 is positioned above the front wall 20F of the upper housing 20. Further, the finger hook recess 40 is positioned at a center region of the document cover 30 in the left-right direction, that is, in a region through which the center line C1 passes, as illustrated in FIG. 2.

As illustrated in FIGS. 3 and 6, the document cover 30 has a front end portion 30F, and the finger hook recess 40 is recessed rearward from the front end portion 30F toward the cover axis X30. Further, the finger hook recess 40 is recessed upward from the bottom surface of the document cover 30. The finger hook recess 40 is elongated in the left-right direction, and defines a space opening frontward and downward at the front end portion 30F of the document cover 30.

Specifically, the finger hook recess 40 has inner surfaces including an upper finger access surface 40U and a lateral finger access surface 40S. The upper finger access surface 40U is an upper inner surface of the finger hook recess 40 that faces downward. The lateral finger access surface 40S is a left side inner surface of the finger hook recess 40 that faces rightward. In other words, the lateral finger access surface 40S is an inner side surface positioned opposite to another inner side surface (right side inner surface) of the finger hook recess 40 with respect to the center line C1 in the left-right direction. Hence, the lateral finger access surface 40S is positioned closer to the operation panel 10 than the right side inner surface of the finger hook recess 40 is to the operation panel 10 in the left-right direction.

The user inserts his fingers in the finger hook recess 40 so that his fingers can touch the upper finger access surface 40U. The finger hook recess 40 allows the user to manually pivotally move the document cover 30 between the closed position illustrated in FIG. 1 and the open position illustrated in FIG. 3.

As illustrated in FIGS. 1 and 2, the finger hook recess 40 is positioned to overlap the side guides 34A and 34B in the left-right direction. In other words, the finger hook recess 40 is aligned with the side guides 34A, 34B in the front-rear direction. With this structure, a direction in which the user moves his hand toward the upper finger access surface 40U of the finger hook recess 40 to manually operate the document cover 30 can be the same as a direction in which the user moves his hand toward the side guides 34A, 34B to manually move the side guides 34A, 34B.

<Operation Panel>

As illustrated in FIG. 3, the upper housing 20 includes the operation panel 10. The operation panel 10 extends frontward from the front wall 20F of the upper housing 20. The operation panel 10 has a top surface 10U, a panel front end 10F, a panel lateral end 10S, and a panel bottom surface 10D (see FIGS. 6 and 7).

The top surface 10U is gradually sloped downward and frontward from an upper edge of the front wall 20F to an upper edge of the panel front end 10F. The panel lateral end 10S is a generally flat side surface constituting a right end of the operation panel 10. The panel lateral end 10S faces rightward and extends in the front-rear direction, up-down direction. The panel lateral end 10S is positioned closer to the center line C1 than another lateral end (left end) of the operation panel 10 is to the center line C1 in the left-right direction.

As illustrated in FIG. 2, the operation panel 10 is positioned leftward of the center line C1, and leftward of the finger hook recess 40. As illustrated in FIGS. 2 and 6, the panel lateral end 10S of the operation panel 10 is at a position coincident with the position of the lateral finger access surface 40S of the finger hook recess 40 in the left-right direction.

The operation panel 10 includes a touch panel 110 and a power button 170B. The touch panel 110 is at a generally center of the top surface 10U of the operation panel 10. The power button 170B is positioned rightward of the touch panel 110 on the top surface 10U.

The power button 170B is configured to switch on and off the power supply to the multifunction device 1. Upon user's depression of the power button 170B to turn on the multifunction device 1, power is supplied to the image forming unit 5, the image reading unit 2, and the conveying unit 3, and the like to render the multifunction device 1 operable.

The touch panel 110 is of a transmissive type, and is configured to accept user's input to transmit commands to the image forming unit 5, the image reading unit 2, and the conveying unit 3, and the like.

Figure 7:
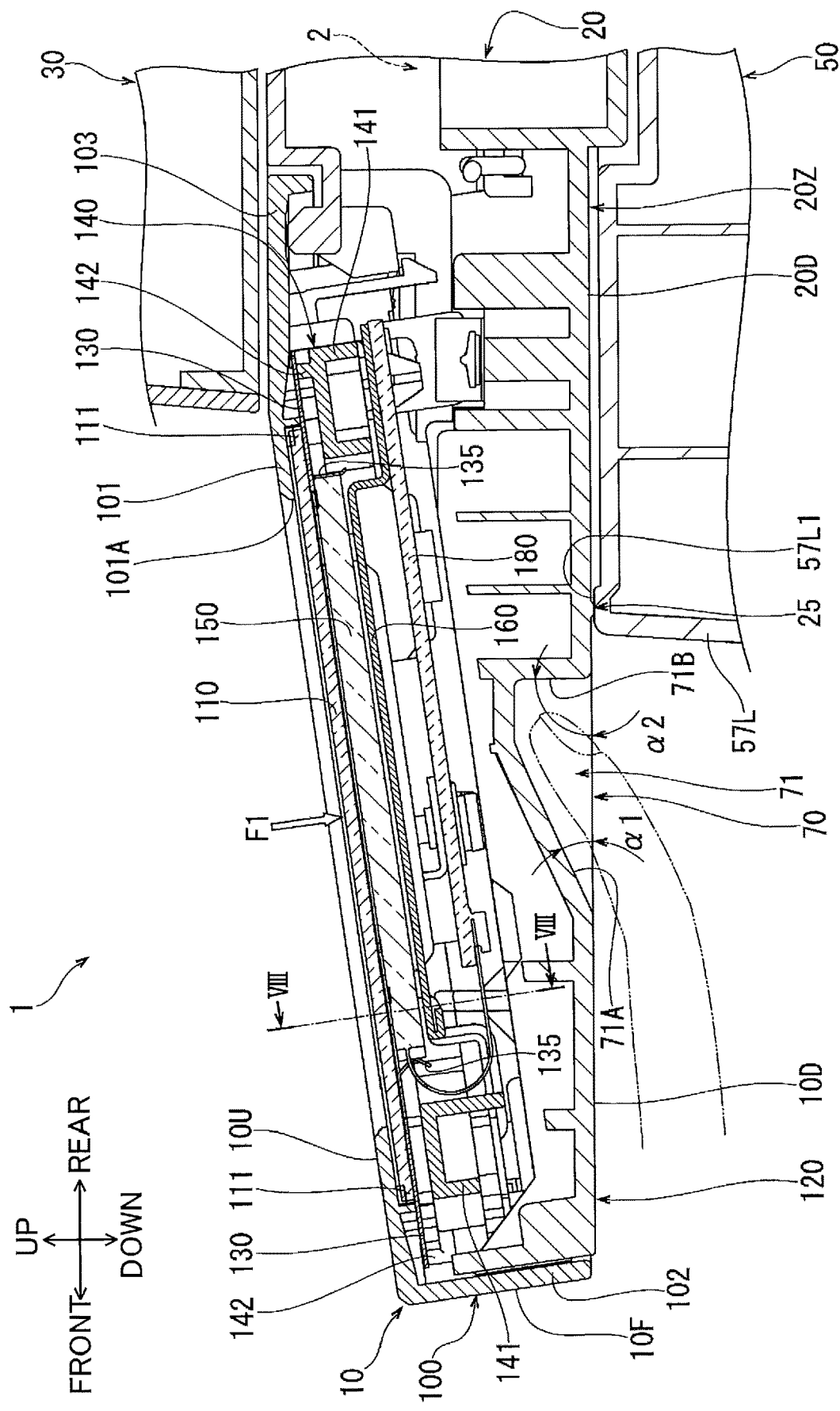
FIG. 7 is a partial cross-sectional view of the multifunction device according to the first embodiment taken along a line VII-VII in FIG. 2.
Figure 8:
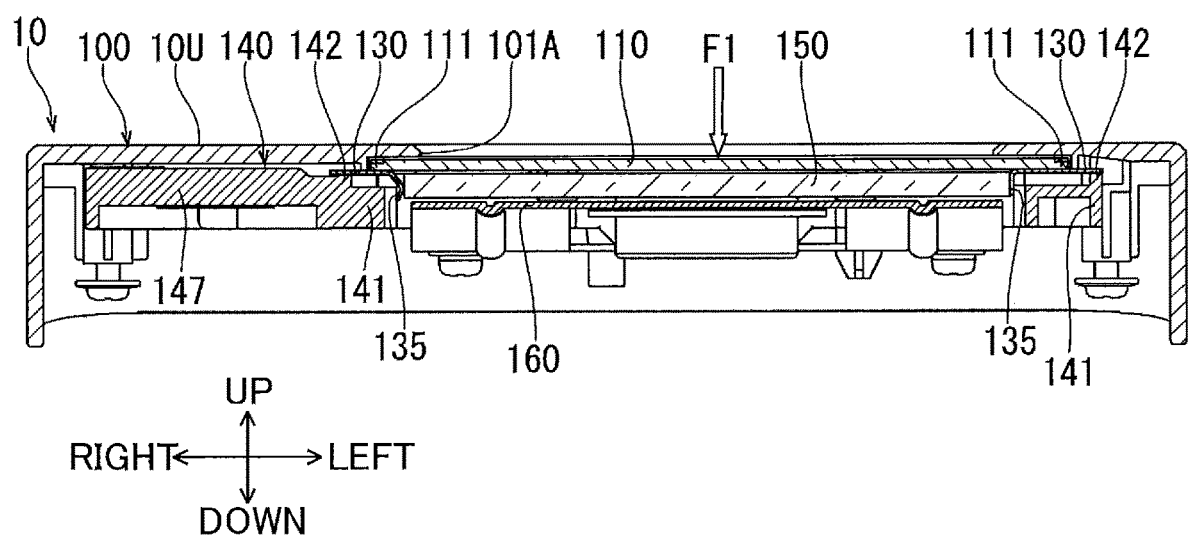
FIG. 8 is a cross-sectional view of the multifunction device according to the first embodiment taken along a line VIII-VIII in FIG. 8.

As illustrated in FIGS. 7 and 8, the operation panel 10 accommodates therein an LCD panel 150. The LCD panel 150 includes a liquid crystal display where images indicative of operational conditions and settings in relation to the image forming unit 5, the image reading unit 2, and the conveying unit 3, etc. are configured to be displayed. The user can visually confirm images displayed on the LCD panel 150 through the touch panel 110.

Further, the user can place his hand on the operation panel 10 to manually pivotally move the upper housing 20 between the seated position illustrated in FIG. 1 and the ascent position illustrated in FIG. 4.

<Exterior Structure of the Operation Panel>

As illustrated in FIGS. 7 through 10, the operation panel 10 includes a panel base 120 and a casing 100 as an exterior structure of the operation panel 10.

Figure 9:
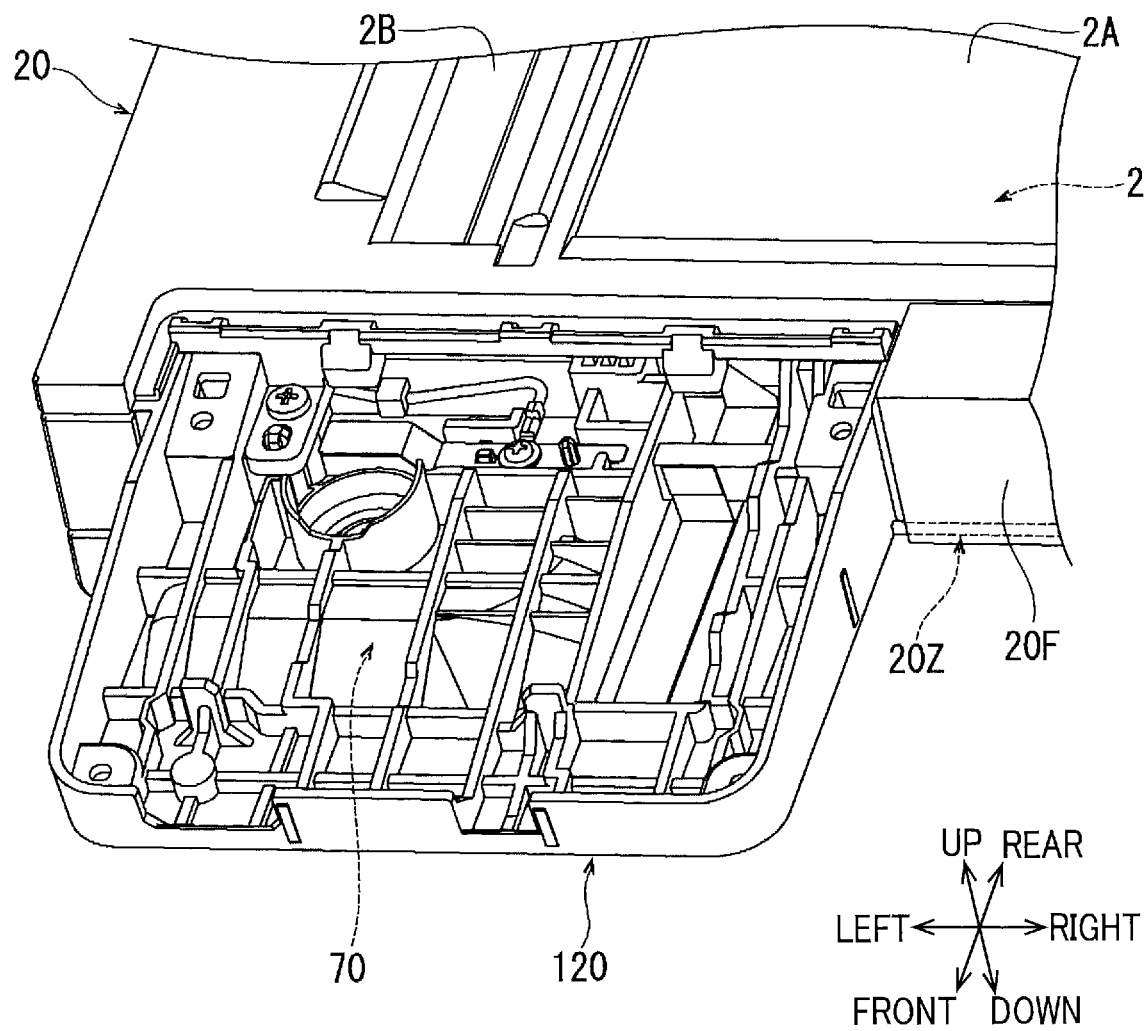
FIG. 9 is a partial perspective view of the upper housing and a panel base of the operation panel (i.e., the operation panel in a state where its casing is removed) in the multifunction device according to the first embodiment.

As illustrated in FIGS. 7 and 9, the upper housing 20 includes a scanner base 20Z made from resin and constituting a bottom wall of the upper housing 20. The panel base 120 is integral with the scanner base 20Z by integral molding. As illustrated in FIGS. 6 and 7, the panel base 120 has a bottom surface constituting the panel bottom surface 10D of the operation panel 10. The panel bottom surface 10D is connected to and substantially in flush with the bottom surface 20D of the upper housing 20.

As illustrated in FIG. 9, the panel base 120 includes a bottom wall having screw holes, an outer peripheral wall protruding upward from an outer peripheral edge of the bottom wall, a latticed rib protruding from the bottom wall, and an engagement portion. The screw holes, the latticed rib and the engagement portion are positioned inside the outer peripheral wall.

Figure 10:
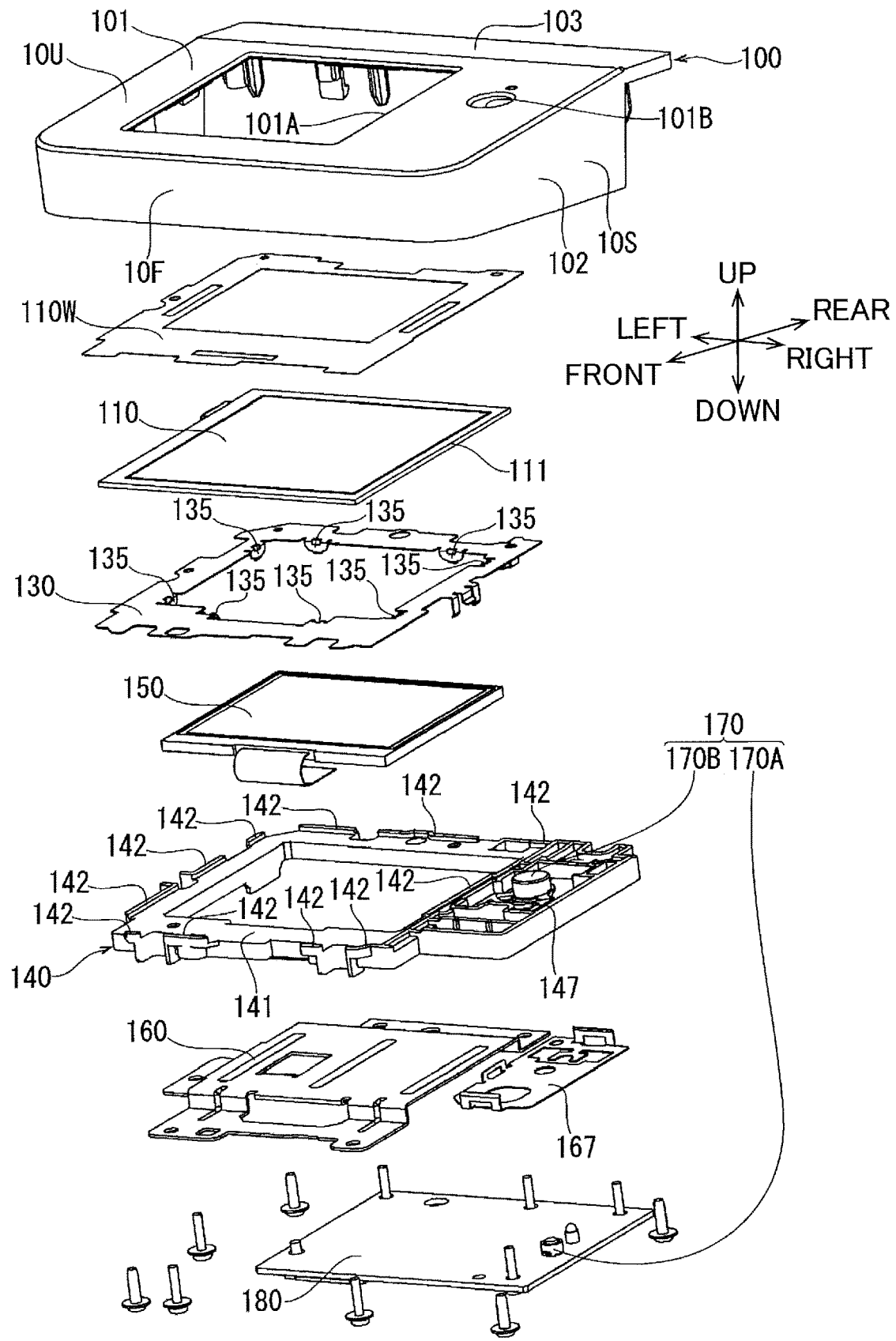
FIG. 10 is an exploded perspective view illustrating the casing, a touch panel, a touch panel holder metal plate, an LCD panel, a touch panel holder, first and second sheet metal shields, and a substrate constituting the operation panel in the multifunction device according to the first embodiment.
Figure 11:
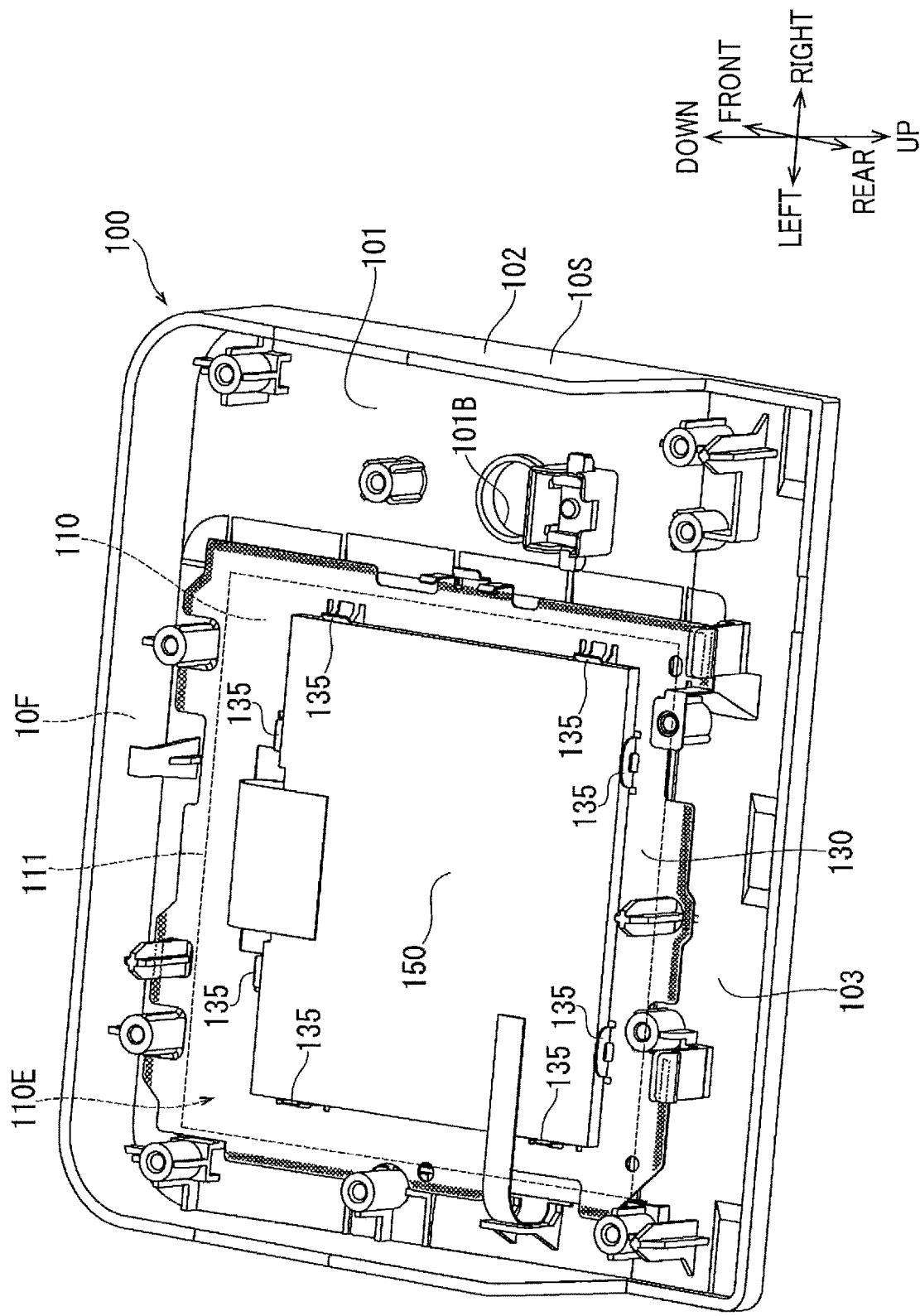
FIG. 11 is a perspective view illustrating a state where the touch panel, the touch panel holder metal plate, and the LCD panel are attached to the casing of the operation panel.

As illustrated in FIGS. 7, 10 and 11, the casing 100 includes a top wall 101, a panel side wall 102, and an extension part 103. The top wall 101 has a panel opening 101A through which the touch panel 110 is exposed to an outside, and a button opening 101B through which the power button 170B is exposed to the outside. The panel side wall 102 protrudes downward from an outer peripheral edge of the top wall 101. The extension part 103 extends rearward from a rear end of the top wall 101.

As illustrated in FIGS. 3 and 7, the casing 100 is mounted on the panel base 120 from above, and screws (not illustrated) are inserted into the screw holes of the panel base 120 from below and are threadingly engaged with the casing 100. In this way, the casing 100 is fixed to the panel base 120.

In a state where the casing 100 is fixed to the panel base 120, the top surface of the top wall 101 constitutes the top surface 10U of the operation panel 10, and the front surface of the panel side wall 102 constitutes the panel front end 10F of the operation panel 10. Further, the right side surface of the panel side wall 102 constitutes the panel lateral end 10S of the operation panel 10, and the extension part 103 constitutes a part of the top surface of the upper housing 20, the part being close to the front wall 20F of the upper housing 20.

As illustrated in FIG. 7, the extension part 103 of the casing 100 extends rearward up to a position where a rear portion of the extension part 103 is covered by the document cover 30 at the closed position.

<Internal Structure of the Operation Panel>

As illustrated in FIGS. 7, 8, and 10, the touch panel 110 has a rectangular shape. The touch panel 110 has an outer peripheral portion 111 in abutment with a peripheral region around the panel opening 101A on an inner surface of the top wall 101 of the casing 100 from below, such that the touch panel 110 is exposed through the panel opening 101A. The touch panel 110 is thus positioned at the top surface 10U of the operation panel 10.

As illustrated in FIG. 10, a frame-like shaped spacer 110W made of a resin film is interposed between the outer peripheral portion 111 of the touch panel 110 and the peripheral region around the panel opening 101A.

Inside the operation panel 10, a touch panel holder metal plate 130, a touch panel holder 140, a first sheet metal shield 160, a second sheet metal shield 167, and a substrate 180 are provided.

The touch panel holder metal plate 130 is a sheet metal member having a generally rectangular frame-like shape. The touch panel holder metal plate 130 has an inner periphery defining an area slightly greater than an area defined by an outer periphery of the LCD panel 150 having a generally rectangular shape. Further, a plurality of flat bits 135 extends downward from the inner periphery of the touch panel holder metal plate 130. The plurality of bits 135 is integral with the touch panel holder metal plate 130 and is in contact with the outer periphery of the LCD panel 150.

The touch panel holder metal plate 130 has an outer peripheral edge which defines an area sufficiently greater than an area defined by the outer peripheral portion 111 of the touch panel 110. As illustrated in FIGS. 7, 8 and 11, the touch panel holder metal plate 130 supports the outer peripheral portion 111 of the touch panel 110 from below. As illustrated in FIG. 11, the outer peripheral portion 111 defines an area 110E representing a region occupied by the touch panel 110 (touch panel region).

Further, the plurality of bits 135 of the touch panel holder metal plate 130 functions to fix the position of the LCD panel 150 that is positioned below the touch panel 110.

The touch panel holder 140 is made from thermoplastic resin and is a product of injection molding. The touch panel holder 140 includes a holder body 141 and a power button support part 147 integral with the holder body 141.

The holder body 141 has a generally rectangular frame-like shape to surround the LCD panel 150 in the front-rear direction and in the left-right direction. The power button support part 147 is connected to a right end of the holder body 141.

The first sheet metal shield 160 is a sheet metal member and is positioned below the holder body 141 of the touch panel holder 140. The second sheet metal shield 167 is also a sheet metal member and is positioned below the power button support part 147 of the touch panel holder 140. The substrate 180 is positioned below the first sheet metal shield 160 and the second sheet metal shield 167.

A stack of the touch panel holder metal plate 130, the touch panel holder 140, the first sheet metal shield 160, and the substrate 180 is screw-fixed to the casing 100 by a plurality of screws. The touch panel 110 and the LCD panel 150 are supported in the stack.

The holder body 141 of the touch panel holder 140 is integrally provided with a plurality of supporting ribs 142. Each supporting rib 142 extends along an outer edge of the holder body 141 and protrudes upward from the outer edge of the holder body 141.

As illustrated in FIGS. 7 and 8, the plurality of supporting ribs 142 of the holder body 141 supports the touch panel holder metal plate 130 from below. In FIG. 11, hatched regions represent regions where the respective supporting ribs 142 are in contact with the touch panel holder metal plate 130.

These regions (hatched regions in FIG. 11) are positioned outside of the region 110E occupied by the touch panel 110 and adjacent to the outer peripheral edge of the touch panel holder metal plate 130. The holder body 141 supports the touch panel holder metal plate 130 from below with the plurality of supporting ribs 142 at these regions.

As illustrated in FIG. 10, the operation panel 10 further includes a power switch 170. The power switch 170 includes a switch body 170A, and the power button 170B described above. The switch body 170A is positioned on the substrate 180 and inside the operation panel 10.

The power button 170B has an upper end portion exposed to the outside through the button opening 101B, and a remaining portion positioned inside the operation panel 10. The power button 170B is positioned above the switch body 170A.

The power button support part 147 of the touch panel holder 140 supports the power button 170B inside the operation panel 10. The power button support part 147 is configured to allow the power button 170B to be displaced downward in response to the user's depression thereon, and is further configured to move the power button 170B upward to restore its original position when the user no longer depresses the power button 170B. The switch body 170A includes a pair of contact configured to open and close in response to the vertical displacement of the power button 170B.

The touch panel holder 140 includes the power button support part 147, and hence, the touch panel holder 140 also functions as a power switch holder for supporting the power switch 170, i.e., the power button 170B of the power switch 170.

As illustrated in FIG. 7, the operation panel 10 accommodates therein the substrate 180 such that substrate 180 is inclined diagonally upward toward the rear (as extending away from the panel front end 10F toward the contacting/separating portion 25).

<Groove of the Operation Panel>

As illustrated in FIGS. 6 and 7, the panel bottom surface 10D of the operation panel 10 has a groove 70. The groove 70 is integrally formed in the bottom wall of the panel base 120. The groove 70 is recessed upward from the panel bottom surface 10D, and includes a first groove part 71 and a second groove part 72.

The first groove part 71 extends along the contacting/separating portion 25 in the left-right direction. The first groove part 71 is positioned between the contacting/separating portion 25 and the panel front end 10F of the operation panel 10 in the front-rear direction. Specifically, the first groove part 71 is positioned frontward of the front part (which is the frontmost end) of the contacting/separating portion 25. The first groove part 71 has a first groove surface 71A and a second groove surface 71B.

As illustrated in FIG. 7, the first groove surface 71A is a front inner surface of the first groove part 71 and faces diagonally downward. The first groove surface 71A is sloped diagonally upward toward the rear (as extending away from the panel front end 10F toward the contacting/separating portion 25).

The second groove surface 71B is a rear inner surface of the first groove part 71. The second groove surface 71B faces frontward, i.e., toward the panel front end 10F. The second groove surface 71B is positioned closer to the contacting/separating portion 25 than the first groove surface 71A is to the contacting/separating portion 25.

The second groove surface 71B is inclined with respect to the panel bottom surface 10D by an angle α2 which is greater than an angle α1 by which the first groove surface 71A is inclined with respect to the panel bottom surface 10D. In the present embodiment, the angle α1 is in a range of from 20° to 30°, and the angle α2 is in a range of from 80° to 90°.

As illustrated in FIG. 6, the second groove part 72 is connected to a right end of the first groove part 71 and extends rearward therefrom along the contacting/separating portion 25. Specifically, the second groove part 72 is positioned rightward of the right part (which is the rightmost end) of the contacting/separating portion 25. The second groove part 72 is positioned between the contacting/separating portion 25 and the panel lateral end 10S in the left-right direction.

The panel bottom surface 10D has a first edge 10D1 and a second edge 10D2. The first edge 10D1 is the left edge of the panel bottom surface 10D and extends in the front-rear direction. The second edge 10D2 is the right edge of the panel bottom surface 10D and extends in the front-rear direction. In other words, the first edge 10D1 is positioned farther away from the center line C1 than the second edge 10D2 is from the center line C1 in the left-right direction. The contacting/separating portion 25 on the panel bottom surface 10D is positioned offset toward the first edge 10D1 with respect to the left-right direction.

The groove 70 has a left end as a first end 70M and a right end as a second end 70N. That is, the first end 70M is an end closer to the first edge 10D1 of the panel bottom surface 10D, and the second end 70N is an end closer to the second edge 10D2 of the panel bottom surface 10D in the left-right direction. Here, referring to FIG. 6, a first distance L1 is defined as a distance between the first end 70M and the first edge 10D1 in the left-right direction, and a second distance L2 is defined as a distance between the second end 70N and the second edge 10D2 in the left-right direction. The distance L2 is greater than the distance L1.

Figure 12:
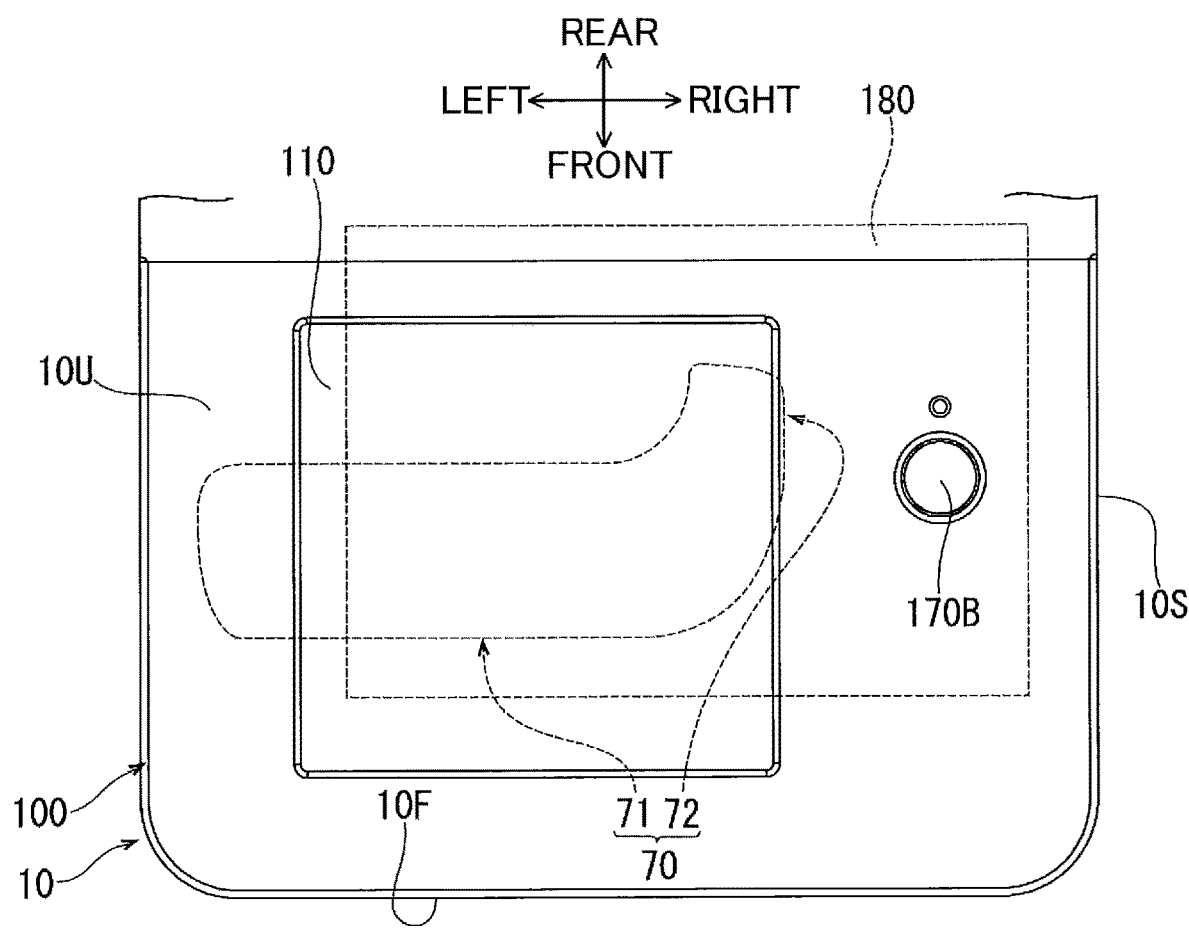
FIG. 12 is a plan view of the operation panel.

As illustrated in FIG. 12, the substrate 180 is at a position overlapping with the groove 70 in the up-down direction in a plan view of the operation panel 10. As illustrated in FIG. 9, the latticed rib of the panel base 120 is arranged in a region occupied by the groove 70 for reinforcement of the groove 70.

As illustrated in FIG. 7, in a case where the user attempts to hook his fingers on the operation panel 10, his fingertips are received into the first groove part 71 or the second groove part 72 of the groove 70, while sliding over the panel bottom surface 10D, before reaching the contacting/separating portion 25. In this way, the groove 70 can restrain the user's fingers from reaching the contacting/separating portion 25.

<Functions and Advantages>

In the multifunction device 1 according to the first embodiment, as illustrated in FIG. 6, the contacting/separating portion 25 is provided at the bottom surface 20D of the upper housing 20. The panel bottom surface 10D of the operation panel 10 has the groove 70 recessed upward, and the groove 70 includes the first groove part 71 positioned between the contacting/separating portion 25 and the panel front end 10F of the operation panel 10 in the front-rear direction.

With this structure, in the case where the user attempts to hook his fingers on the operation panel 10, his fingertips, which slidingly move over the panel bottom surface 10D, move into the first groove part 71 (or the second groove part 72) of the groove 70 before reaching the contacting/separating portion 25. In this way, the groove 70 can restrain the user's fingers from reaching the contacting/separating portion 25 on the panel bottom surface 10D. Accordingly, in the multifunction device 1 according to the first embodiment, the user's fingers are less likely to be pinched between the contacting/separating portion 25 and the left abutment portion 57L1 of the lower housing 50.

Contrary to the above-identified conventional multifunction device which includes a leg portion protruding downward from the bottom surface of the operation panel, the multifunction device 1 according to the first embodiment does not include any leg portion that may largely protrude downward from the bottom surface 20D of the upper housing 20 at a position forward of the contacting/separating portion 25 in order to restrict the user's fingers from reaching the contacting/separating portion 25. Therefore, there is no need for the multifunction device 1 according to the first embodiment to suffer from any problem that may be incurred due to the presence of the bulky leg portion in the up-down direction. Accordingly, the multifunction device 1 according to the first embodiment can provide an enhanced operability and a reduction in size in the up-down direction.

Further, in the multifunction device 1, the first groove part 71 extends in the left-right direction at a position between the contacting/separating portion 25 and the panel front end 10F in the front-rear direction. Further, the groove 70 also includes the second groove part 72 connected to the first groove part 71 and extending rearward therefrom, such that the first groove part 71 and the second groove part 72 extend along the contacting/separating portion 25. With this structure, in a case where a user attempts to hook his fingers on the operation panel 10 in various directions, his fingertips can move into the first groove part 71 or the second groove part 72 before reaching the contacting/separating portion 25. Accordingly, the multifunction device 1 can securely restrain the user's fingers from reaching the contacting/separating portion 25.

Further, in the multifunction device 1, the operation panel 10 is positioned leftward relative to the center line C1, as illustrated in FIG. 2. Further, as illustrated in FIG. 6, the second groove part 72 is positioned between the contacting/separating portion 25 and the panel lateral end 10S of the operation panel 10 in the left-right direction. With this structure, the second groove part 72, which is closer to the user who is standing near the center line C1 than the first groove part 71 is to the user, forms an L-shaped entrenchment or barrier over the contacting/separating portion 25 in combination with the first groove part 71. Accordingly, the multifunction device 1 can further securely restrain the user's fingers from reaching the contacting/separating portion 25.

Further, in the multifunction device 1, the contacting/separating portion 25 is at the position offset toward the first edge 10D1 of the panel bottom surface 10D with respect to the left-right direction, and the second distance L2 between the second end 70N of the groove 70 and the second edge 10D2 of the panel bottom surface 10D is greater than the first distance L1 between the first end 70M of the groove 70 and the first edge 10D1 of the panel bottom surface 10D. In other words, on the panel bottom surface 10D, the groove 70 is positioned not to occupy a region near the second edge 10D2 (opposite the first edge 10D1 toward which the contacting/separating portion 25 is offset) where deflection of the panel base 120 is likely to occur, i.e., a region closer to the center of the upper housing 20 in the left-right direction. With this structure, the presence of the groove 70 in the panel bottom surface 10D is less likely to hamper the mechanical strength of the upper housing 20.

Further, in the multifunction device 1 according to the first embodiment, the operation panel 10 accommodates the substrate 180 therein such that the substrate 180 is inclined diagonally upward toward the rear (in a direction from the panel front end 10F toward the contacting/separating portion 25), as illustrated in FIG. 7. Further, as illustrated in FIG. 12, the substrate 180 is positioned to overlap the groove 70 in the up-down direction. Further, as illustrated in FIG. 7, the first groove part 71 has the first groove surface 71A that is inclined diagonally upward in the direction from the panel front end 10F toward the contacting/separating portion 25, i.e., diagonally upward toward the rear. The inclined arrangement of the first groove surface 71A can provide a suitable space for the layout of the substrate 180 inside the operation panel 10, and also the first groove surface 71A can reliably introduce the user's fingertips into the first groove part 71 at a position forward of the contacting/separating portion 25.

Further, in the multifunction device 1, the first groove part 71 also has the second groove surface 71B which faces the panel front end 10F and which is positioned closer to the contacting/separating portion 25 than the first groove surface 71A is to the contacting/separating portion 25 in the front-rear direction. Further, the second groove surface 71B is inclined with respect to the panel bottom surface 10D by the angle α2 that is greater than the angle α1 by which the first groove surface 71A is inclined with respect to the panel bottom surface 10D. With this structure, the second groove surface 71B can receive the fingertips moving along the first groove surface 71A inside the first groove part 71 to stop the movement of the fingertips. Accordingly, in the multifunction device 1, the user's fingers are further reliably restrained from reaching the contacting/separating portion 25.

Further, in the multifunction device 1 according to the first embodiment, as illustrated in FIG. 2, the finger hook recess 40 is positioned at the center region of the document cover 30 in the left-right direction, i.e., at the region where the center line C1 passes. The operation panel 10 is positioned leftward of the finger hook recess 40. Further, the panel lateral end 10S (which is the right end of the operation panel 10) is arranged at a position coincident with the position of the lateral finger access surface 40S (which is the left end of the finger hook recess 40) in the left-right direction. That is, the operation panel 10 is positioned offset from the finger hook recess 40 in the left-right direction.

With this structure, the user's fingers are hard to abut on the operation panel 10 and thus are not likely to be pinched between the finger hook recess 40 and the operation panel 10 when the user attempts to pivotally move the document cover 30 by hooking his fingers on the upper finger access surface 40U of the finger hook recess 40. Further, the user can easily hook his fingers on the upper finger access surface 40U of the finger hook recess 40, since the finger hook recess 40 is positioned at the center region of the document cover 30 in the left-right direction. Accordingly, in the multifunction device 1, an enhanced operability in pivotally moving the document cover 30 can be obtained.

Further, as illustrated in FIGS. 1 and 2, the finger hook recess 40 is recessed from the front end portion 30F of the document cover 30 toward the cover axis X30, and the position of the panel lateral end 10S is coincident with the position of the lateral finger access surface 40S in the left-right direction. With this structure, the user can easily recognize the position of the finger hook recess 40 with reference to the position of the panel lateral end 10S. Further, the finger hook recess 40 is provided as a recess rather than as a protruding portion, and therefore, improved designability of the multifunction device 1 can be obtained relatively easily.

Further, in the multifunction device 1, the finger hook recess 40 is at a position overlapping with the side guides 34A, 34B in the left-right direction. That is, the finger hook recess 40 is positioned to be aligned with the side guides 34A, 34B in the front-rear direction. With this structure, the direction in which the user moves his hand toward the upper finger access surface 40U of the finger hook recess 40 to manually operate the document cover 30 can be the same as the direction in which the user moves his hand toward the side guides 34A, 34B to manually move the side guides 34A, 34B. Accordingly, intricacy involved in user's moving the side guides 34A, 34B and the document cover 30 can be mitigated in the multifunction device 1.

Further, as illustrated in FIGS. 3 and 7, the extension part 103 of the casing 100 of the operation panel 10 extends to such a position that the extension part 103 is covered by the document cover 30 at the closed position. With this structure, since the front end portion 30F of the document cover 30 at the closed position abuts on the extension part 103 from above and presses the operation panel 10, rattling of the operation panel 10 is less likely to occur when the user pivotally moves the upper housing 20 by hooking his fingers on the operation panel 10 or when the user manipulates the touch panel 110 or the power button 170B.

Further, as illustrated in FIGS. 7, 8, 10 and 11, the touch panel holder metal plate 130 supports the outer peripheral portion 111 of the touch panel 110 from below, and the touch panel holder 140 supports the touch panel holder metal plate 130 from below at the region outside of the touch panel region 110E (where the touch panel 110 is present) by the plurality of supporting ribs 142. With this structure, as illustrated in FIGS. 7 and 8, not only the touch panel 110 but also the touch panel holder metal plate 130 can deflect when an excessive load F1 is imparted on the touch panel 110 by the user's depression of the touch panel 110. As a result, this configuration can suppress a local bending of the touch panel 110, thereby suppressing the touch panel 110 from being damaged or broken.

Further, in the multifunction device 1, as illustrated in FIG. 10, the touch panel holder 140 includes the power button support part 147. That is, the touch panel holder 140 also functions as a power switch holder for supporting the power switch 170, more specifically, the power button 170B of the power switch 170. This structure can not only reduce the number of parts and components required for the operation panel 10, but also facilitate the assembly of the operation panel 10, and, hence, can provide the multifunction device 1 at a lower cost, in comparison with a case where the touch panel holder 140 and a power switch holder of the operation panel 10 are provided separately from each other.

Modifications to the First Embodiment

Figure 13:
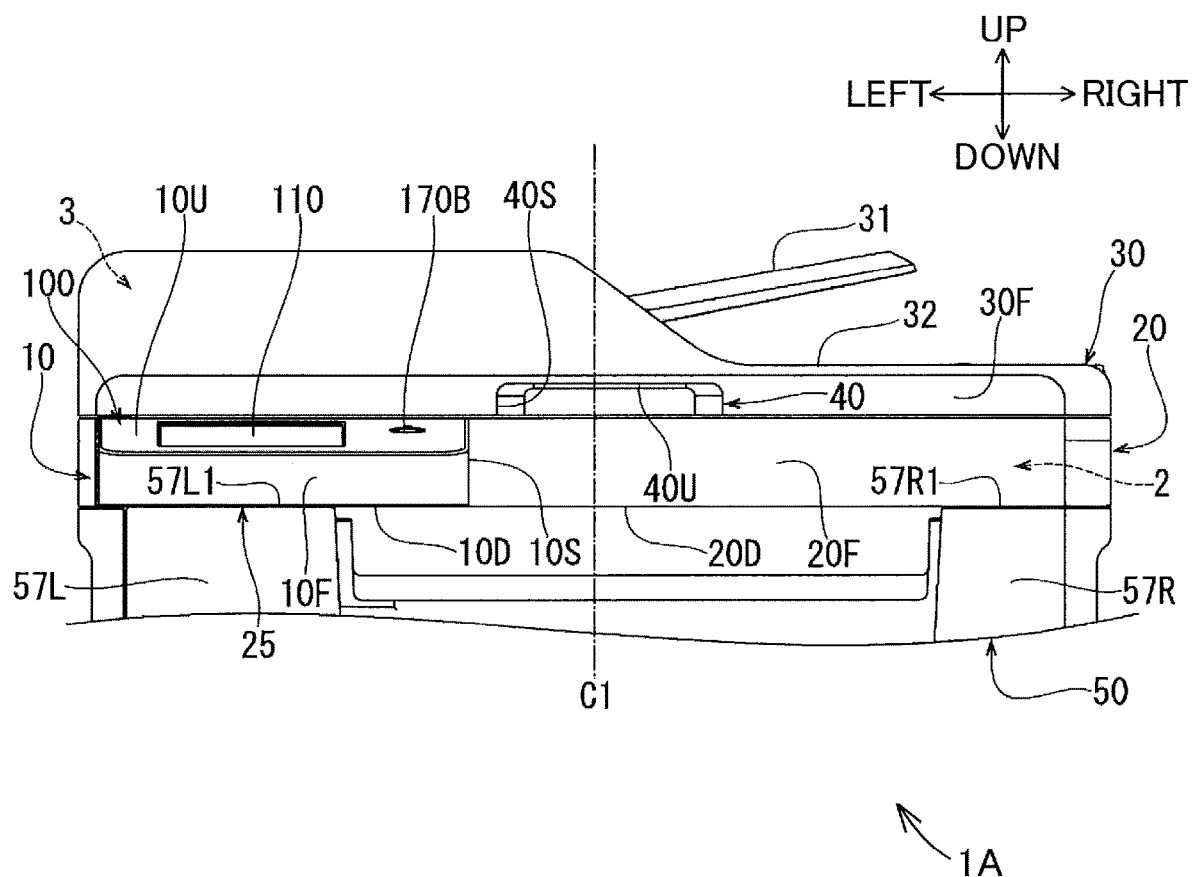
FIG. 13 is a partial front view of a multifunction device according to a modification to the first embodiment.

FIG. 13 illustrates a multifunction device 1A according to a modification to the first embodiment. In the multifunction device 1A, the position of the operation panel 10 is modified. More specifically, the operation panel 10 of the multifunction device 1A is displaced leftward from the position of the operation panel 10 in the first embodiment. Hence, in the multifunction device 1A, the panel lateral end 10S of the operation panel 10 is positioned spaced apart from and leftward of the lateral finger access surface 40S. That is, in the multifunction device 1A, the panel lateral end 10S of the operation panel 10 is at a position spaced apart from the position of the lateral finger access surface 40S of the finger hook recess 40 toward the left, i.e., in a direction away from the center line C1 with respect to the left-right direction.

This structure can also improve the operability to the document cover 30 for pivotally moving the document cover 30, as in the multifunction device 1 according to the first embodiment.

2. Second Embodiment

Figure 14:
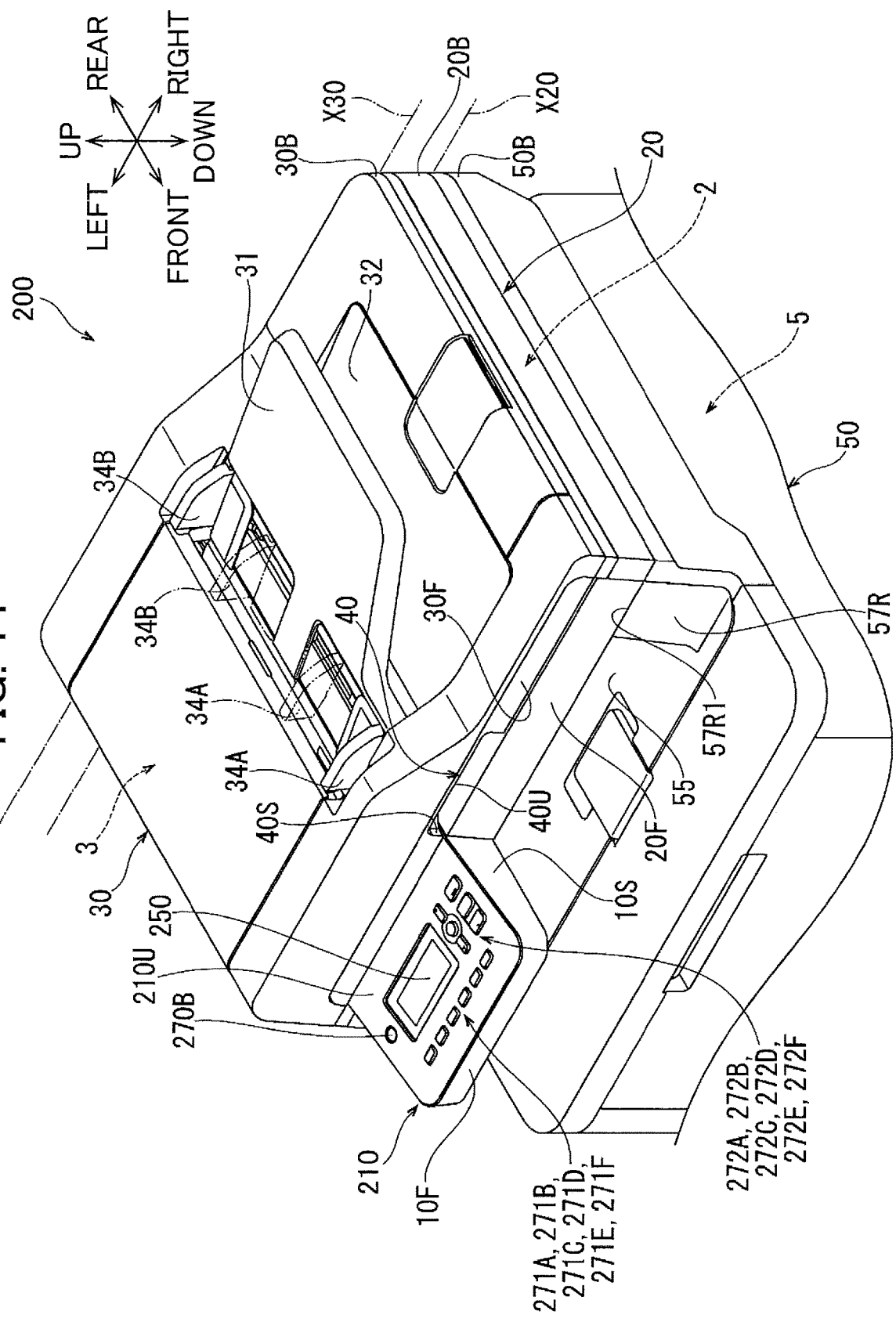
FIG. 14 is a partial perspective view of a multifunction device according to a second embodiment.

A multifunction device 200 according to a second embodiment will next be described with reference to FIGS. 14 through 16, wherein like parts and components are designated by the same reference numerals as those in the first embodiment to avoid duplicating description.

The multifunction device 200 according to the second embodiment includes an operation panel 210, in place of the operation panel 10 according to the first embodiment. The operation panel 210 has a top surface 210U, instead of the top surface 10U of the operation panel 10 of the first embodiment. Further, the operation panel 210 includes a power button 270B, a display 250, a first set of operation keys 271A, 271B, 271C, 271D, 271E, 271F, and a second set of operation keys 272A, 272B, 272C, 272D, 272E, 272F, instead of the power button 170B and the touch panel 110 provided in the operation panel 10 of the first embodiment.

Figure 16:
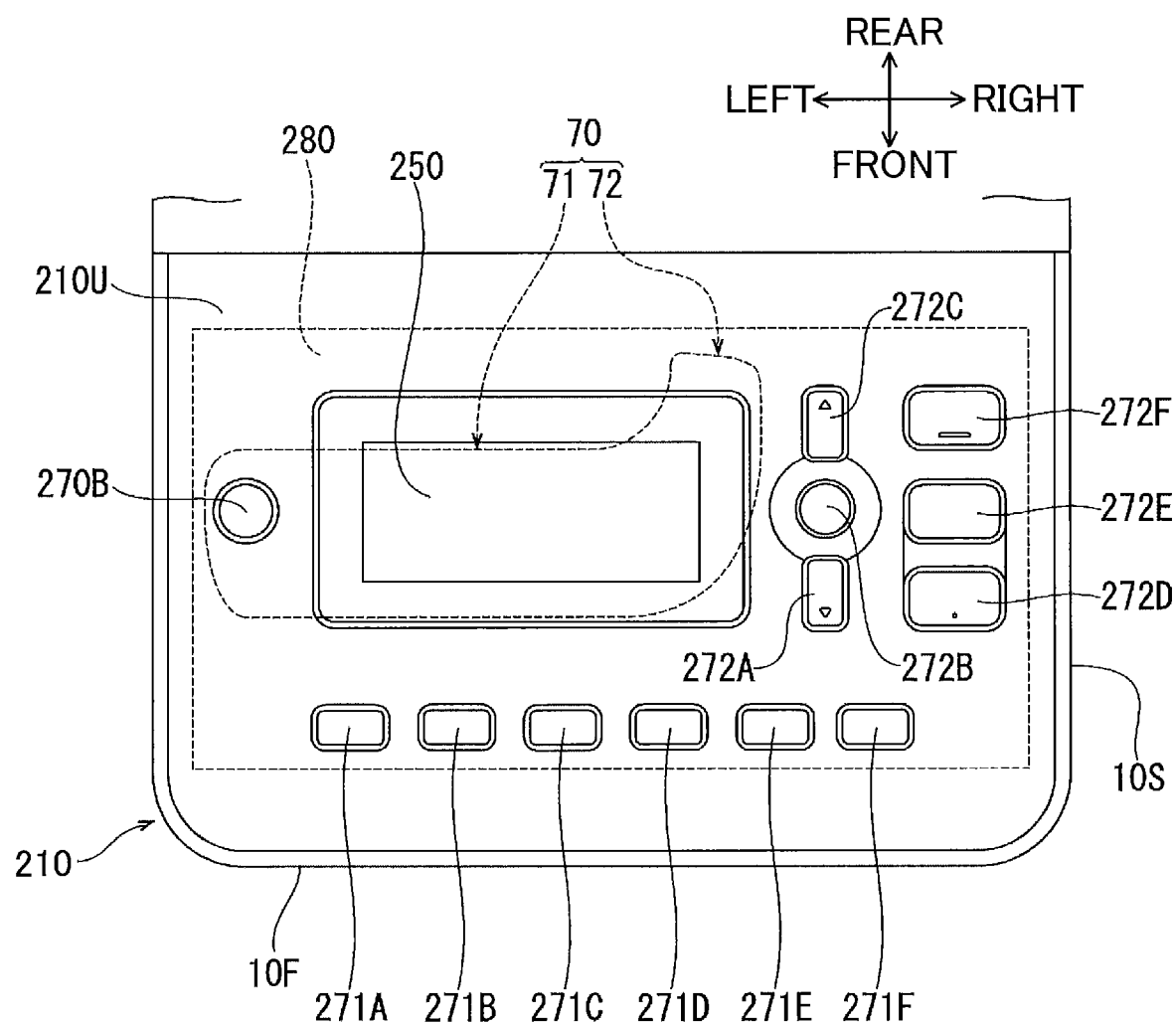
FIG. 16 is a plan view of an operation panel in the multifunction device according to the second embodiment.

As illustrated in FIG. 16, the display 250 is arranged at a substantially center region on the top surface 210U of the operation panel 210. The power button 270B is positioned leftward of the operation panel 210 at the top surface 210U.

The power button 270B is configured to switch on and off the power supply to the multifunction device 200. Upon the user's depression of the power button 270B to turn on the multifunction device 200, power is supplied to the image forming unit 5, the image reading unit 2, and the conveying unit 3, and the like to render the multifunction device 200 operable.

The display 250 is configured to display images indicative of operational conditions and settings in relation to the image forming unit 5, the image reading unit 2 and the conveying unit 3. That is, the display 250 is configured to display these images only, and is configured not to accept any commands through user's inputs.

The operation keys 271A through 271F in the first set are all positioned closer to the panel front end 10F than the display 250 is to the panel front end 10F at the top surface 210U of the operation panel 210. The operation keys 271A through 271F are arrayed in line in the left-right direction.

The first set of the operation keys 271A through 271F is configured to accept user's inputs to transmit commands to the image forming unit 5, the image reading unit 2, the conveying unit 3 and the like.

The operation keys 272A through 272F in the second set are positioned rightward of the display 250 at the top surface 210U of the operation panel 210. The operation keys 272A through 272F are arrayed with the display 250 in the left-right direction.

The second set of the operation keys 272A through 272F is configured to accept user's inputs to transmit commands to the image forming unit 5, the image reading unit 2, the conveying unit 3, and the like.

Figure 15:
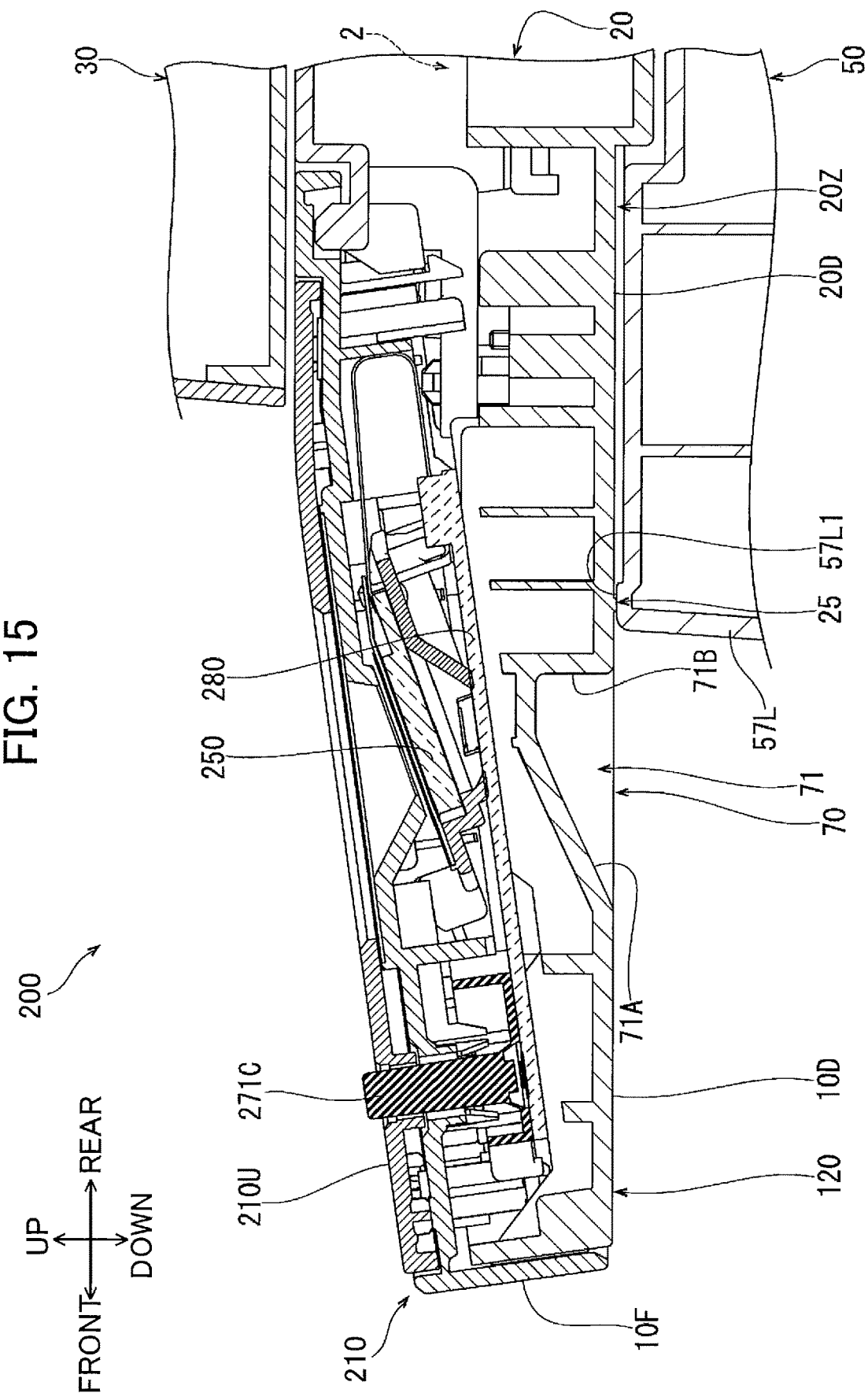
FIG. 15 is a partial cross-sectional view of the multifunction device according to the second embodiment taken along a line corresponding to the line VII-VII in FIG. 7.

As illustrated in FIG. 15, the contacting/separating portion 25 and the groove 70 of the multifunction device 200 are the same as those of the multifunction device 1.

As illustrated in FIG. 16, the groove 70 is positioned to overlap the display 250 and the power button 270B in the up-down direction in a plan view of the operation panel 210. Further, the groove 70 is positioned rearward of the first set of the operation keys 271A through 271F, and leftward of the second set of the operation keys 272A through 272F.

As illustrated in FIG. 15, the operation panel 210 accommodates therein a substrate 280 such that the substrate 280 is inclined diagonally upward toward the rear (in the direction from the panel front end 10F toward the contacting/separating portion 25). As illustrated in FIG. 16, the substrate 280 is at a position overlapping with the groove 70 in the up-down direction in the plan view of the operation panel 210.

<Functions and Advantages>

In the multifunction device 200 according to the second embodiment, when the user attempts to hook his fingers on the operation panel 210, his fingertips sliding over the panel bottom surface 10D of the operation panel 210 move into the first groove part 71 or the second groove part 72 of the groove 70 before reaching the contacting/separating portion 25. In this way, the groove 70 can restrain the user's fingers from reaching the contacting/separating portion 25. Accordingly, the multifunction device 200 according to the second embodiment can restrain the user's finger(s) from being pinched between the contacting/separating portion 25 and the left abutment portion 57L1 of the lower housing 50.

Further, the multifunction device 200 does not include any leg portion largely protruding downward from the bottom surface 20D of the upper housing 20, the leg portion being conventionally provided frontward of the contacting/separating portion 25 so as to prevent the user's hand from reaching the contacting/separating portion 25. Therefore, the multifunction device 200 according to the second embodiment can obviate a conventional problem caused by the presence of the bulky leg portion in the up-down direction. Accordingly, the multifunction device 200 according to the second embodiment can provide an enhanced operability and a reduction in size in the up-down direction, as in the multifunction device 1 according to the first embodiment.

Further, in the multifunction device 200, as illustrated in FIG. 16, the groove 70 is at the position overlapping with the display 250 and the power button 270B in the plan view of the operation panel 210. Further, the groove 70 is positioned rearward of the first set of operation keys 271A through 271F to be spaced away therefrom. With this structure, even when the user strongly depresses the operation keys 271A through 271F, the operation panel 210 can sustain the user's pressing force in a region where the presence of the groove 70 has little adverse effect on the strength of the operation panel 210. That is, the groove 70, which may cause degradation in the strength of the operation panel 210, does not exist directly below the first set of the operation keys 271A through 271F. As a result, this configuration can restrain deformation of the operation panel 210.

Incidentally, the depression to the power button 270B is less frequently performed, in comparison with the depression to the other operation keys, since the power button 270B is only operated to turn on and off the multifunction device 200. Accordingly, the overlapping positioning of the power button 270B with the groove 70 in the up-down direction is of no consequence.

Further, in the multifunction device 200, as illustrated in FIG. 16, the groove 70 is at a position overlapping with the display 250 and leftward of the second set of the operation keys 272A through 272F in the up-down direction. With this structure, even when the user strongly depresses the operation keys 272A through 272F, the operation panel 210 can sustain the user's pressing force in a region where the presence of the groove 70 has little adverse effect on the strength of the operation panel 210. That is, the groove 70, which may cause degradation in the strength of the operation panel 210, does not exist directly below the second set of the operation keys 272A through 272F. Accordingly, this configuration can restrain deformation of the operation panel 210.

Further, in the multifunction device 200, the substrate 280 is at the position overlapping with the groove 70 in the up-down direction. Further, as illustrated in FIG. 15, the first groove surface 71A of the first groove part 71 is inclined diagonally upward toward the rear (in the direction from the panel front end 10F toward the contacting/separating portion 25). With this structure, the inclined arrangement of the first groove surface 71A can provide a suitable space for the layout of the substrate 280 inside the operation panel 210, and also the first groove surface 71A can reliably introduce the user's fingertips into the first groove part 71 at a position frontward of the contacting/separating portion 25.

3. Variations and Modifications

Various modifications are conceivable to the first and second embodiments described above.

For example, in the first and second embodiments, the groove 70 has an L-shape having the first groove part 71 and the second groove part 72. Alternatively, the groove 70 may have the first groove part 71 only. Still alternatively, the groove 70 may have a generally U-shape configured of a first groove part, and two second groove parts extending rearward from respective ends of the first groove part.

In the first and second embodiments, the finger hook recess 40 is employed as an example of a finger hook portion of the disclosure, and the lateral finger access surface 40S serves as an example of a lateral end of the finger hook portion. As a modification, the finger hook portion may be configured as a protrusion (such as a handle) protruding frontward from the front end portion 30F of the document cover 30. In this example, one of the left and right outer surfaces of the protrusion may serve as another example of the lateral end of the finger hook portion.

In the first embodiment, the power switch 170 is a push button switch including the power button 170B and the switch body 170A. Instead of the push button switch, a locker switch and a slide switch are also available as the power switch.

In the first embodiment, the power button support part 147 of the touch panel holder 140 only supports the power button 170B. However, the touch panel holder of the disclosure may also serve as a power switch holder supporting the power button and the switch body.

The present disclosure is applicable to any multifunction device including an image reading unit and an image forming unit.

While the description has been made in detail with reference to specific embodiments thereof, it would be apparent to those skilled in the art that many modifications and variations may be made thereto.

[Remarks]

The multifunction devices 1, 1A, 200 are examples of a multifunction device. The image reading unit 2 is an example of an image reading unit. The image forming unit 5 is an example of an image forming unit. The lower housing 50 is an example of a lower housing. The upper housing 20 is an example of an upper housing. The bottom surface 20D is an example of a housing bottom surface. The operation panels 10, 210 are examples of an operation panel. The panel bottom surface 10D is an example of a panel bottom surface. The panel lateral end 10S is an example of a panel lateral end of the operation panel. The first edge 10D1 and second edge 10D2 of the panel bottom surface 10D are examples of first and second edges of a panel bottom surface of the operation panel. The groove 70 is an example of a groove. The first end 70M of the groove 70 is an example of a first end of the groove, and the second end 70N of the groove 70 is an example of the second end of the groove. The contacting/separating portion 25 is an example of a contacting/separating portion. The finger hook recess 40 is an example of a finger hook portion. The lateral finger access surface 40S is an example of one lateral end of the finger hook portion, and an example of a lateral inner surface of the finger hook portion. The document cover 30 is an example of a document cover. The casing 100 is an example of a casing of the operation panel. The touch panel 110 is an example of a touch panel. The touch panel holder metal plate 130 is an example of a touch panel holder metal plate. The touch panel holder 140 is an example of a touch panel holder. The touch panel region 110E is an example of a touch panel region.

What is claimed is:

1. A multifunction device comprising:
   an image reading unit comprising a reading sensor configured to read an image on a document;
   an image forming unit positioned below the image reading unit and configured to form an image on a sheet;
   a lower housing accommodating the image forming unit therein;
   an upper housing accommodating the image reading unit therein and pivotally movable about a pivot axis extending in a left-right direction relative to the lower housing, the upper housing comprising:
      a front wall extending in the left-right direction; and
      a rear end portion positioned rearward of the front wall and connected to the lower housing such that the upper housing is pivotable about the pivot axis between a seated position where the front wall of the upper housing is seated on the lower housing and an ascent position where the front wall of the upper housing is separated away upward from the lower housing, the upper housing having a housing bottom surface;
   an operation panel protruding frontward from the front wall of the upper housing, the operation panel having a panel front end and a panel bottom surface formed with a groove recessed upward therefrom; and
   a contacting/separating portion provided on the housing bottom surface, the contacting/separating portion being in abutment with the lower housing in a state where the upper housing is at the seated position and being separated away from the lower housing in a state where the upper housing is at the ascent position, the groove including a first groove part positioned between the panel front end and the contacting/separating portion.

2. The multifunction device according to claim 1,
   wherein the first groove part extends in the left-right direction, and wherein the groove further includes a second groove part connected to the first groove part and extending rearward from the first groove part, the first groove part and the second groove part extending along the contacting/separating portion.

3. The multifunction device according to claim 2,
wherein the upper housing defines a center in the left-right direction,
wherein the operation panel extends in the left-right direction and is positioned offset from the center in the left-right direction, the operation panel having a panel lateral end and another panel lateral end opposite to each other in the left-right direction, the panel lateral end being closer to the center in the left-right direction of the upper housing than the another panel lateral end is to the center in the left-right direction of the upper housing, and
wherein the second groove part is positioned between the contacting/separating portion and the panel lateral end.

4. The multifunction device according to claim 1,
wherein the contacting/separating portion is a rib protruding downwardly from the housing bottom surface.

5. The multifunction device according to claim 4,
wherein the rib extends in the left-right direction.

6. The multifunction device according to claim 1,
wherein the upper housing defines a center in the left-right direction,
wherein the operation panel is positioned offset from the center in the left-right direction,
wherein the panel bottom surface of the operation panel has a first edge extending in a front-rear direction and a second edge extending in the front-rear direction and spaced apart from the first edge in the left-right direction, the first edge being farther away from the center in the left-right direction of the upper housing than the second edge is from the center in the left-right direction of the upper housing,
wherein the contacting/separating portion is positioned closer to the first edge than to the second edge in the left-right direction, and
wherein the groove has a first end closer to the first edge and a second end closer to the second edge in the left-right direction, the first edge and the first end defining a first distance therebetween in the left-right direction, and the second edge and the second end defining a second distance therebetween in the left-right direction, the second distance being greater than the first distance.

7. The multifunction device according to claim 1,
wherein the operation panel accommodates a substrate therein such that the substrate is inclined upward in a direction from the panel front end toward the contacting/separating portion,
wherein the substrate is positioned to overlap with the groove in an up-down direction, and
wherein the first groove part has a first groove surface inclined upward in the direction from the panel front end toward the contacting/separating portion with respect to the panel bottom surface.

8. The multifunction device according to claim 7,
wherein the first groove part further has a second groove surface positioned closer to the contacting/separating portion than the first groove surface is to the contacting/separating portion in the left-right direction, the first groove surface being inclined with respect to the panel bottom surface by a first angle, the second groove surface facing the panel front end and being inclined with respect to the panel bottom surface by a second angle greater than the first angle.

9. The multifunction device according to claim 1,
wherein the operation panel has a top surface and comprises:
a display positioned at the top surface; and
a first operation key positioned closer to the panel front end than the display is to the panel front end at the top surface, the first operation key being configured to accept a user's input to transmit a command to at least one of the image forming unit and the image reading unit, and
wherein the groove is positioned to overlap the display and spaced apart from the first operation key in an up-down direction.

10. The multifunction device according to claim 1,
wherein the operation panel has a top surface and comprises:
a display positioned at the top surface; and
a second operation key positioned at the top surface to be aligned with the display in the left-right direction, the second operation key being configured to accept a user's input to transmit a command to at least one of the image forming unit and the image reading unit, and
wherein the groove is positioned to overlap the display and to be spaced apart from the second operation key in an up-down direction.

11. A multifunction device comprising:
an image reading unit having a document loading surface and comprising a reading sensor configured to read an image on a document supported by the document loading surface;
an image forming unit positioned below the image reading unit and configured to form an image on a sheet;
a lower housing accommodating the image forming unit therein;
an upper housing accommodating the image reading unit therein, the upper housing having a rear end portion and comprising:
a front wall extending in a left-right direction and positioned frontward of the rear end portion; and
an operation panel protruding frontward from the front wall; and
a document cover connected to the rear end portion and pivotally movable relative to the upper housing about a cover axis extending in the left-right direction between a closed position where the document cover closes the document loading surface and an open position where the document cover opens the document loading surface, the document cover comprising a finger hook portion configured to receive a user's hand to pivotally move the document cover relative to the upper housing, the finger hook portion being positioned above the front wall of the upper housing and in a region including a center of the document cover in the left-right direction,
wherein the operation panel has a panel lateral end and another panel lateral end opposite to each other in the left-right direction, the panel lateral end being closer to the center in the left-right direction of the document cover than the another panel lateral end is to the center in the left-right direction of the document cover,
wherein the finger hook portion has one lateral end and another lateral end opposite to each other with respect to the center of the document cover in the left-right direction, the one lateral end being closer to the operation panel than the another lateral end is to the operation panel in the left-right direction, and
wherein the panel lateral end of the operation panel is at a position either
coincident with a position of the one lateral end of the finger hook portion in the left-right direction, or
spaced apart from the position of the one lateral end of the finger hook portion in a direction away from the center of the document cover with respect to the left-right direction.

12. The multifunction device according to claim 11,
wherein the finger hook portion is a recess that is recessed toward the cover axis at a front end portion of the document cover,
wherein the one lateral end of the finger hook portion is a lateral inner surface of the recess, and
wherein the panel lateral end of the operation panel is at a position coincident with the lateral inner surface of the recess in the left-right direction.

13. The multifunction device according to claim 11,
wherein the document cover comprises:
 a supply tray configured to support the document to be read;
 a conveying unit configured to convey the document on the supply tray toward the reading sensor; and
 a pair of side guides provided at the supply tray and slidably movable in a front-rear direction to perform positioning of the document on the supply tray in the front-rear direction, and
wherein the finger hook portion is at a position overlapping with the side guides in the left-right direction.

14. The multifunction device according to claim 11,
wherein the operation panel comprises a casing having a portion constituting a part of an upper surface of the upper housing, the portion being close to the front wall and covered by the document cover in a state where the document cover is at the closed position.

15. The multifunction device according to claim 11,
wherein the rear end portion of the upper housing is connected to the lower housing such that the upper housing is pivotable about a pivot axis extending in the left-right direction, relative to the lower housing, between a seated position where the front wall of the upper housing is seated on the lower housing and an ascent position where the front wall of the upper housing is separated away upward from the lower housing,
wherein the upper housing has a housing bottom surface provided with a contacting/separating portion, the contacting/separating portion being in abutment with the lower housing in a state where the upper housing is at the seated position and being separated away from the lower housing in a state where the upper housing is at the ascent position, and
wherein the operation panel has: a panel front end; and a panel bottom surface formed with a groove recessed upward therefrom, the groove including a first groove part positioned between the panel front end and the contacting/separating portion in a front-rear direction.

16. The multifunction device according to claim 15,
wherein the first groove part extends in the left-right direction, and
wherein the groove further includes a second groove part connected to the first groove part and extending rearward from the first groove part, the first groove part and the second groove part extending along the contacting/separating portion.

17. The multifunction device according to claim 15,
wherein the upper housing defines a center in the left-right direction coincident with the center in the left-right direction of the document cover,
wherein the panel bottom surface has a first edge extending in the front-rear direction and a second edge extending in the front-rear direction and spaced apart from the first edge in the left-right direction, the first edge being farther away from the center in the left-right direction of the upper housing than the second edge is from the center in the left-right direction of the upper housing,
wherein the contacting/separating portion is positioned closer to the first edge than to the second edge in the left-right direction, and
wherein the groove has a first end closer to the first edge and a second end closer to the second edge in the left-right direction, the first edge and the first end defining a first distance therebetween in the left-right direction, and the second edge and the second end defining a second distance therebetween in the left-right direction, the second distance being greater than the first distance.

18. The multifunction device according to claim 11,
wherein the operation panel has a top surface and defines an internal space therein, the operation panel comprising:
 a touch panel positioned at the top surface of the operation panel, the touch panel having an outer peripheral region and defining a touch panel region;
 a touch panel holder metal plate positioned in the internal space and in contact with the outer peripheral region of the touch panel to support the touch panel from below; and
 a touch panel holder positioned in the internal space and supporting the touch panel holder metal plate from below, the touch panel holder being in contact with the touch panel holder metal plate in a region outside of the touch panel region.

19. The multifunction device according to claim 18,
wherein the operation panel further comprises a power switch comprising:
 a power button positioned at the top surface of the operation panel; and
 a switch body positioned in the internal space, the switch body having a pair of contacts configured to open and close in response to displacement of the power button, and
wherein the touch panel holder further supports the power button.

* * * * *